US007997432B2

(12) United States Patent
Porubcansky et al.

(10) Patent No.: US 7,997,432 B2

(45) Date of Patent: Aug. 16, 2011

(54) TRUNNION TRANSPORTATION SYSTEM AND CRANE USING SAME

(75) Inventors: Kenneth J. Porubcansky, Whitelaw, WI (US); Bronson E. Foust, Mishicot, WI (US)

(73) Assignee: Manitowoc Crane Companies, LLC, Manitowoc, WI (US)

( * ) Notice: Subject to any disclaimer, the term of this patent is extended or adjusted under 35 U.S.C. 154(b) by 0 days.

(21) Appl. No.: 12/561,058

(22) Filed: Sep. 16, 2009

(65) Prior Publication Data

US 2010/0084357 A1 Apr. 8, 2010

Related U.S. Application Data

(60) Provisional application No. 61/099,098, filed on Sep. 22, 2008.

(51) Int. Cl.
*B62D 55/00* (2006.01)

(52) U.S. Cl. .......................................... 212/301; 180/9.48

(58) Field of Classification Search .................. 212/301; 180/9.48

See application file for complete search history.

(56) References Cited

U.S. PATENT DOCUMENTS

| | | | | |
|---|---|---|---|---|
| 4,029,165 | A * | 6/1977 | Miller et al. | 180/6.48 |
| 4,266,679 | A * | 5/1981 | Juergens | 212/181 |
| 4,763,961 | A | 8/1988 | Parrott | |
| 5,074,370 | A | 12/1991 | Lindstrot et al. | |
| 6,318,484 | B2 | 11/2001 | Lykken et al. | |
| 6,848,522 | B2 | 2/2005 | Moore et al. | |
| 6,851,494 | B2 | 2/2005 | Harthauser | |

OTHER PUBLICATIONS

Bucyrus-Erie 300-D brochure and pictures, including letter dated Jan. 23, 1978 and Preliminary Specification, 13 pgs total (1978).

* cited by examiner

*Primary Examiner* — Thomas J. Brahan

(74) *Attorney, Agent, or Firm* — Brinks Hofer Gilson & Lione; Steven P. Shurtz

(57) ABSTRACT

A mobile lift crane includes a carbody and at least four crawlers attached to the carbody, each crawler having a crawler frame attached to the carbody by a trunnion having an axis. The crawler frame is attached to the carbody so as to be able to pivot with respect to the carbody about the axis of the trunnion. The crane also includes a rotating bed rotatably connected to the carbody such that the rotating bed can swing with respect to the crawlers and a boom pivotally mounted on a front portion of the rotating bed. A linear actuator is connected between the crawler frame and the carbody and extends through the trunnion.

The linear actuator is part of a self attachment mechanism. The trunnion includes a tubular member with a longitudinal axis, a first end configured for connection to the crane carbody and a second end configured for connection to the crawler frame. At least one of the ends is configured to allow rotational movement of the crawler frame relative to the carbody about the longitudinal axis. The linear actuator is mounted within the hollow central tubular member. The linear actuator is preferably a hydraulic cylinder. A carbody connector is attached to one end of the hydraulic cylinder, and a crawler frame connector is attached to the other end of the hydraulic cylinder.

21 Claims, 18 Drawing Sheets

FIG. 3B
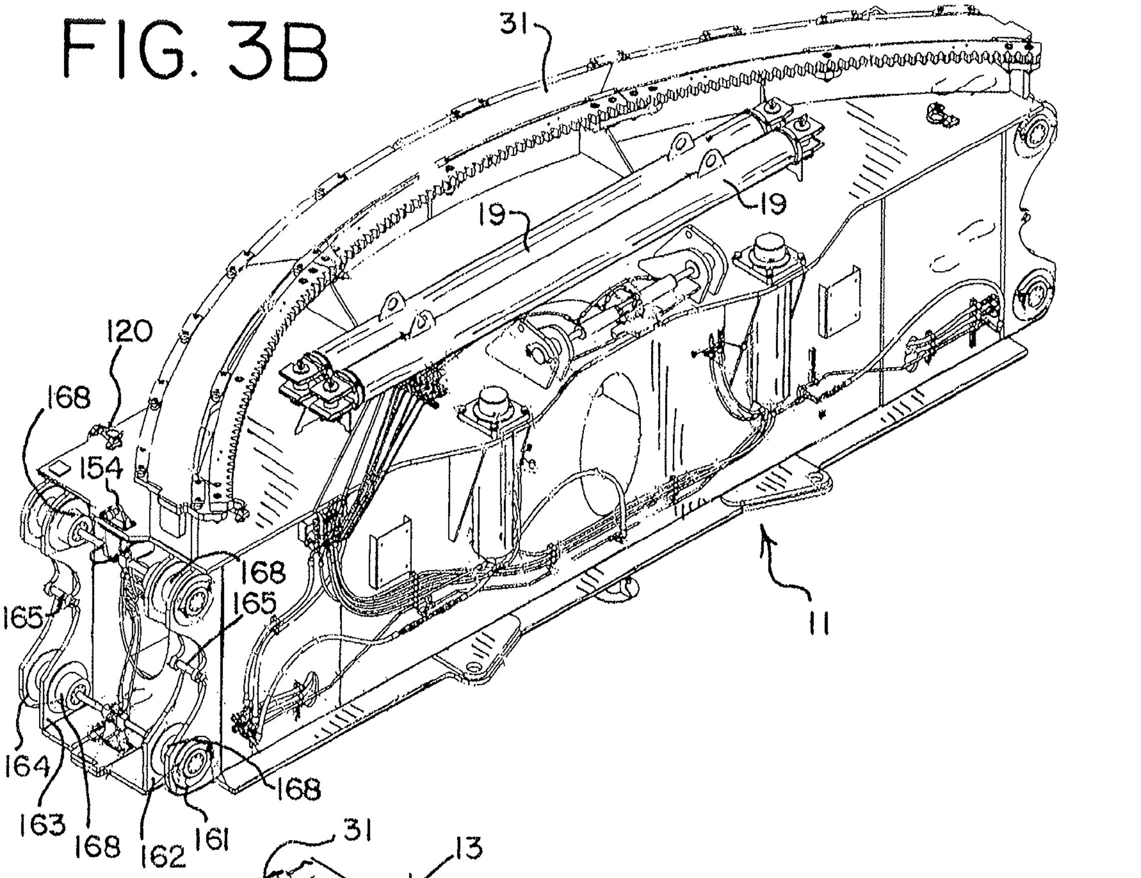
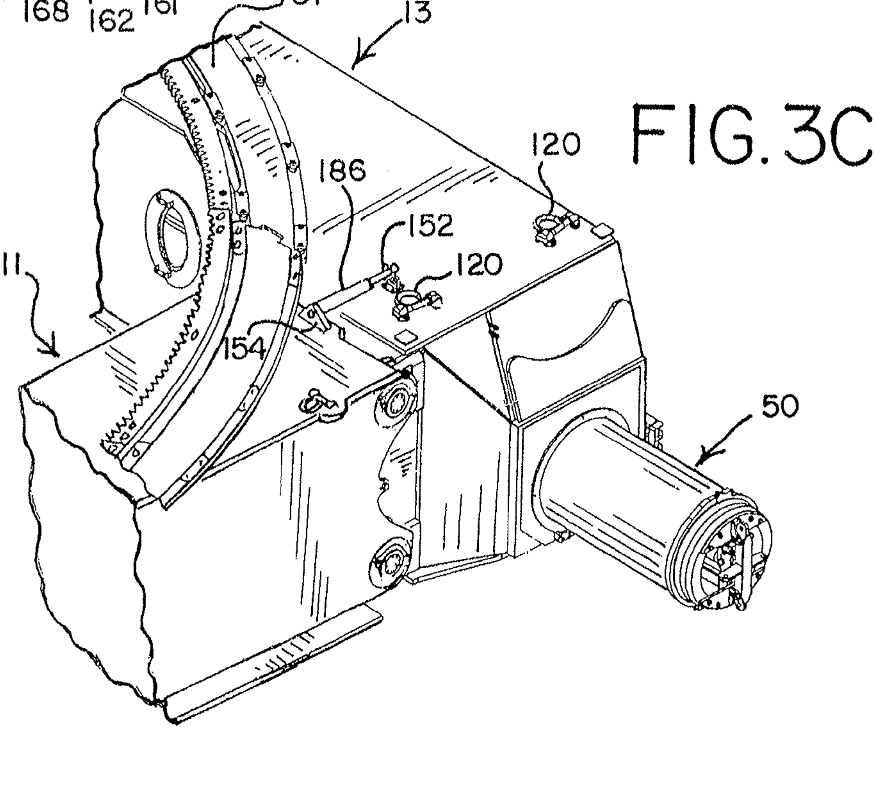
FIG. 3C

FIG. 20
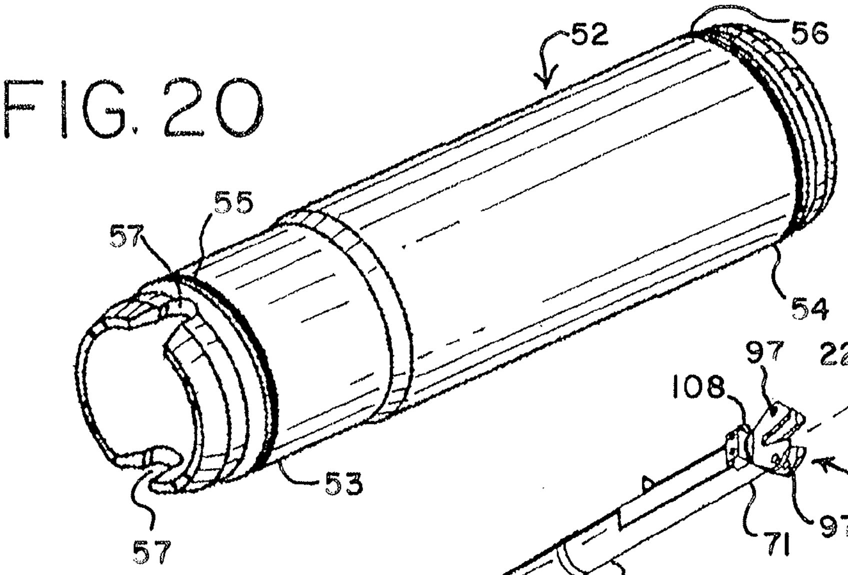
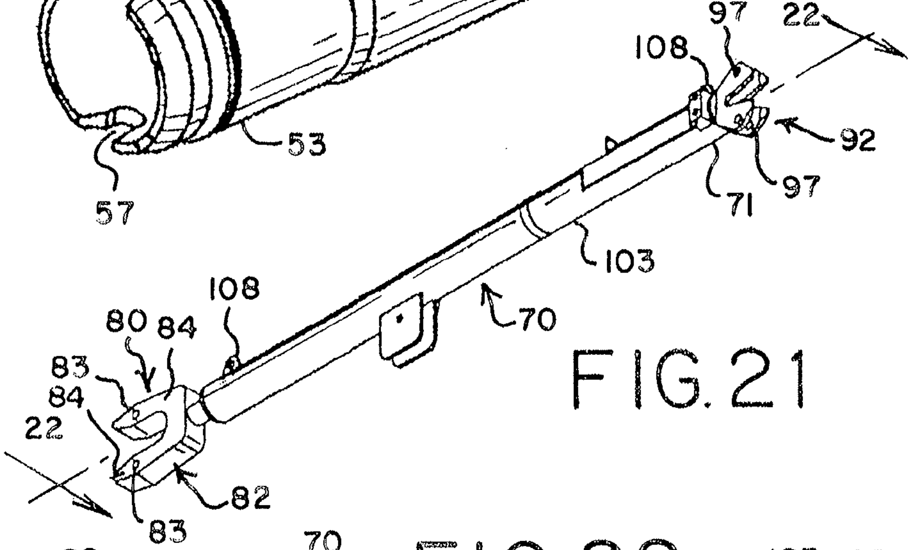
FIG. 21
FIG. 22
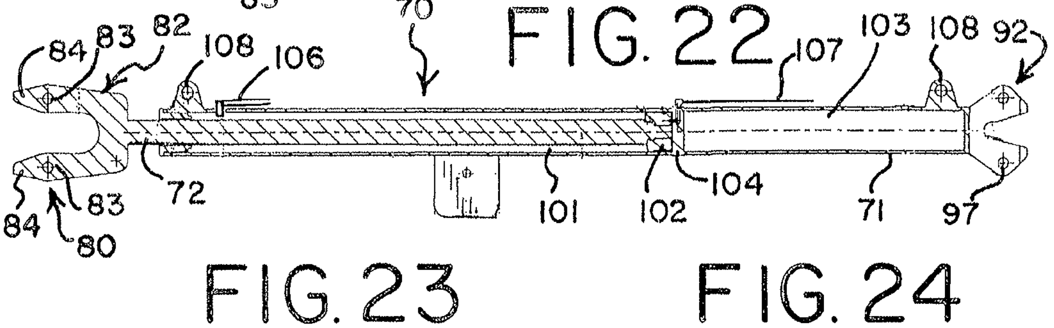
FIG. 23
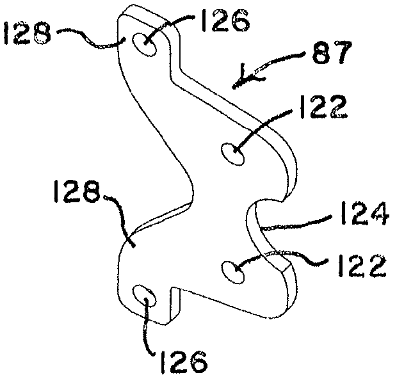
FIG. 24
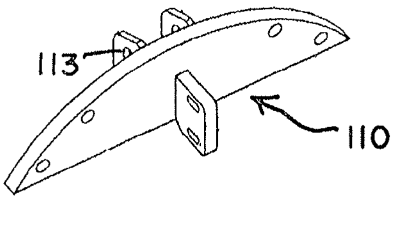

TRUNNION TRANSPORTATION SYSTEM AND CRANE USING SAME

REFERENCE TO EARLIER FILED APPLICATION

The present application claims the benefit of the filing date under 35 U.S.C. §119(e) of Provisional U.S. Patent Application Ser. No. 61/099,098 filed Sep. 22, 2008; which is hereby incorporated by reference in its entirety.

BACKGROUND

The present invention relates to a mobile lifting crane that uses crawlers mounted on a carbody through a trunnion. The invention provides a way of easily installing the trunnion and connecting the crawler to the carbody when the crane is set up at a new job site.

Mobile lift cranes typically include a carbody having moveable ground engaging members; a rotating bed rotatably connected to the carbody such that the rotating bed can swing with respect to the ground engaging members; a boom pivotally mounted on a front portion of the rotating bed, with a load hoist line extending there from, and counterweight to help balance the crane when the crane lifts a load. There are different types of ground engaging members, most notably tires for truck mounted cranes, and crawlers. The crawlers typically have a frame, at least one drive tumbler supported on the frame; and a track made of a plurality of connected track shoes wrapped around the frame and engaging the drive tumbler so that a plurality of the shoes are in contact with the drive tumbler. Many cranes have two crawlers, one on each side of the carbody. However, there are some cranes that have four crawlers, two on each side of the carbody.

Because a mobile left crane is often used on uneven ground surfaces, there is a benefit for a crane having four crawlers to have each crawler mounted to the carbody in a manner that the crawler frame can pivot about a horizontal axis through which it is connected to the carbody. With such a pivoting movement, as the crane travels over uneven ground, the crawler can rotate with respect to the carbody as needed to best distribute the weight of the crane and any load being lifted. One method of mounting the crawlers to the carbody so that they can pivot is to use a trunnion. An example of a crane with four trunnion mounted crawlers is a Bucyrus Erie Model 300D dragline.

Since a crane will often be used in various locations, it needs to be designed so that it can be transported from one job site to the next. Moving a crane can be a formidable task when the machine is large and heavy. For example, highway limits on vehicle-axle loads must be observed and overhead obstacles can dictate long, inconvenient routings to the job site. One solution to improving the mobility of large construction machines, such as cranes, is to disassemble them into smaller, more easily handled components. The separate components can then be transported to the new job site where they are reassembled. For example, the typical practice has been to disconnect, remove, and transport the crawlers separately from the crane carbody. For a very large crane, it may also be necessary to separate the carbody into individual members. The ease with which the crane can be dismantled and set up has an impact on the total cost of using the crane. Thus, to the extent that fewer man-hours are needed to set up the crane, there is a direct advantage to the crane owner In conventional cranes, each of the crawlers is typically bolted to the carbody of the crane. Because the connections between the crawlers and the crane carbody must sustain tremendous loads, the size and number of bolts used in these connections can be substantial. Accordingly, removing each of the crawlers from the carbody of the crane usually requires the loosening and removal of numerous large bolts from each of the crawler to carbody connections. Once the crane components are delivered to the new job site, then the crawlers must be carefully aligned with the carbody, and each of the bolts must then be re-inserted and tightened for each of the crawler-to-carbody connections. As a consequence, the disconnection and re-connection of the crawlers to the crane can be a difficult and time-consuming process.

One attempt to overcome some of the above-described problems is disclosed in U.S. Pat. No. 5,823,279 to Petzold, entitled "Carbody to Crawler Connection", which issued Oct. 20, 1998. This patent discloses a carbody to crawler connection that utilizes a pair of pins. A vertical pin extends upwardly from the horizontal flange on the top of the carbody arm and is configured to loosely engage a hole in the horizontal flange on the top of the crawler frame weldment. A horizontal pin passes through lower portions of the vertical flanges of the carbody arm and the vertical flange of the crawler frame weldment. The crawler is attached to the carbody by first placing the hole in the horizontal flange on the top of the crawler frame weldment over the vertical pin on the top of the carbody arm. The hole in the vertical flange of the crawler frame weldment is then aligned with the holes in the vertical flanges of the carbody arm. The horizontal pin is then inserted through these holes to complete the connection.

The carbody to crawler connection disclosed in U.S. Pat. No. 5,823,279 has several advantages over the bolted-type connections typically used in conventional cranes. For example, this type of connection eliminates the need to carefully align and fasten numerous bolts. However, this type of connection does not allow the crawler to be attached by a trunnion so that the crawler may pivot about a horizontal axis. U.S. Pat. No. 7,007,764 discloses another carbody-to-crawler connection that has proved valuable for larger cranes, again allowing the crawlers to be easily and quickly removed and installed for crane transportation. However, again this type of connection does not allow for the use of a pivotal connection between the carbody and the crawler frame.

Thus there remains a need for a mechanism whereby a very large crane can be provided with crawlers that are mounted to a carbody with a pivotal connection that can be easily taken apart and reassembled, and preferably that can be used on a carbody that itself can be easily taken apart and transported and then reassembled at a new job site

BRIEF SUMMARY

The present invention includes a crane that has a carbody with at least four crawlers that are each attached with a trunnion connection, allowing pivoting about a horizontal axis. The inventive trunnion connection system can be used for very large cranes. It makes it possible to disassemble and reassemble the carbody and crawler connection relatively quickly and easily. The invention also involves a method of disassembling and transporting a crane, and setting up a crane, utilizing the trunnion connection system.

In a first aspect, the invention is a mobile lift crane comprising a carbody; at least four crawlers attached to the carbody, each crawler having a crawler frame attached to the carbody by a trunnion having an axis, the crawler frame being attached to the carbody so as to be able to pivot with respect to the carbody about the axis of the trunnion; a rotating bed rotatably connected to the carbody such that the rotating bed can swing with respect to the crawlers; and a boom pivotally mounted on the rotating bed. A linear actuator is connected between the crawler frame and the carbody and extends through the trunnion, providing a powered mechanism for connecting the trunnion to the carbody and the crawler to the trunnion.

In a second aspect, the invention is a trunnion for a mobile lift crane having a self attachment mechanism. The trunnion comprises a) a tubular member with a longitudinal axis, a first end configured for connection to a crane carbody and a second end configured for connection to a crawler frame, with at least one of the ends being configured to allow rotational movement of the crawler frame relative to the carbody about the longitudinal axis; b) a linear actuator mounted within the hollow central tubular member, the linear actuator having a first and second end; c) a carbody connector attached to the first end of the linear actuator, and d) a crawler frame connector attached to the second end of the linear actuator.

In a third aspect, the invention is a method of assembling a mobile lift crane having, during operation, i) a carbody, ii) at least four crawlers each connected to the carbody through a trunnion, each trunnion comprising a hollow central tubular member, the trunnion allowing the crawler to pivot with respect to the carbody, and the crawlers allowing the crane to travel over the ground, iii) a rotating bed rotatably connected to the carbody such that the rotating bed can swing with respect to the crawlers, and iv) a boom pivotally mounted on the rotating bed, with a load hoist line extending there from; the method comprising a) providing each trunnion with a self attachment mechanism comprising i) a linear actuator mounted within the hollow central tubular member, the linear actuator having a first and second end, ii) a carbody connector attached to the first end of the linear actuator, and iii) a crawler frame connector attached to the second end of the linear actuator; b) placing the trunnion adjacent the carbody; c) extending the linear actuator to a point at which the carbody connector can be connected to the carbody, and connecting the carbody connector to the carbody; d) retracting the linear actuator, thereby pulling the trunnion into a working position with respect to the carbody; e) placing the crawler adjacent the trunnion; f) extending the linear actuator to a point at which the crawler frame connector can be connected to the crawler frame, and connecting the crawler frame connector to the crawler frame; and g) retracting the linear actuator, thereby pulling the crawler frame into a working position with respect to the trunnion.

The self attachment mechanism in the preferred trunnion of the present invention provides a powered apparatus to help assemble the heavy crawler to the carbody, even though the crawler has a snug fit on the trunnion to provide pivoting movement with respect to the carbody. The hydraulic cylinder can not only be used to install the trunnion in the carbody, but can also be used to install the crawler assembly on the carbody. The carbody of the preferred crane includes connectors that allow the carbody to be taken apart, transported to a new job site as separate members, and then quickly reassembled at the new jobsite. In addition, the present invention provides different configurations of transporting the trunnion, namely: the trunnion assembly can be transported as a separate item; one or both trunnions can be installed in and transported with a carbody beam assembly; or the trunnion can be installed in and transported with the crawler assembly. These various trunnion shipping options allow the crane to be transported in different configurations that provide flexibility in complying with various global shipping weight constraints. These and other advantages of the invention, as well as the invention itself, will be more easily understood in view of the attached drawings.

BRIEF DESCRIPTION OF THE DRAWINGS

FIG. 3B is a perspective view of a side member making up the carbody used on crane of FIG. 1, with carbody braces in a storage position.

FIG. 3C is a perspective view of the connection between a side member and an end cross member in the carbody on the crane of FIG. 1.

FIG. 20 is a perspective view of the tubular member used in the trunnion assembly of FIG. 8.

FIG. 21 is a perspective view of the hydraulic cylinder used in the trunnion assembly of FIG. 8.

FIG. 22 is a cross-sectional view taken along line 22-22 of FIG. 21.

FIG. 23 is a perspective view of a retaining plate used to connect the trunnion assembly to the carbody, as shown in FIG. 9A.

FIG. 24 a perspective view of a bracket attached to the end of the trunnion tubular member at the carbody end.

DETAILED DESCRIPTION OF THE DRAWINGS AND THE PRESENTLY PREFERRED EMBODIMENTS

Figure 1:
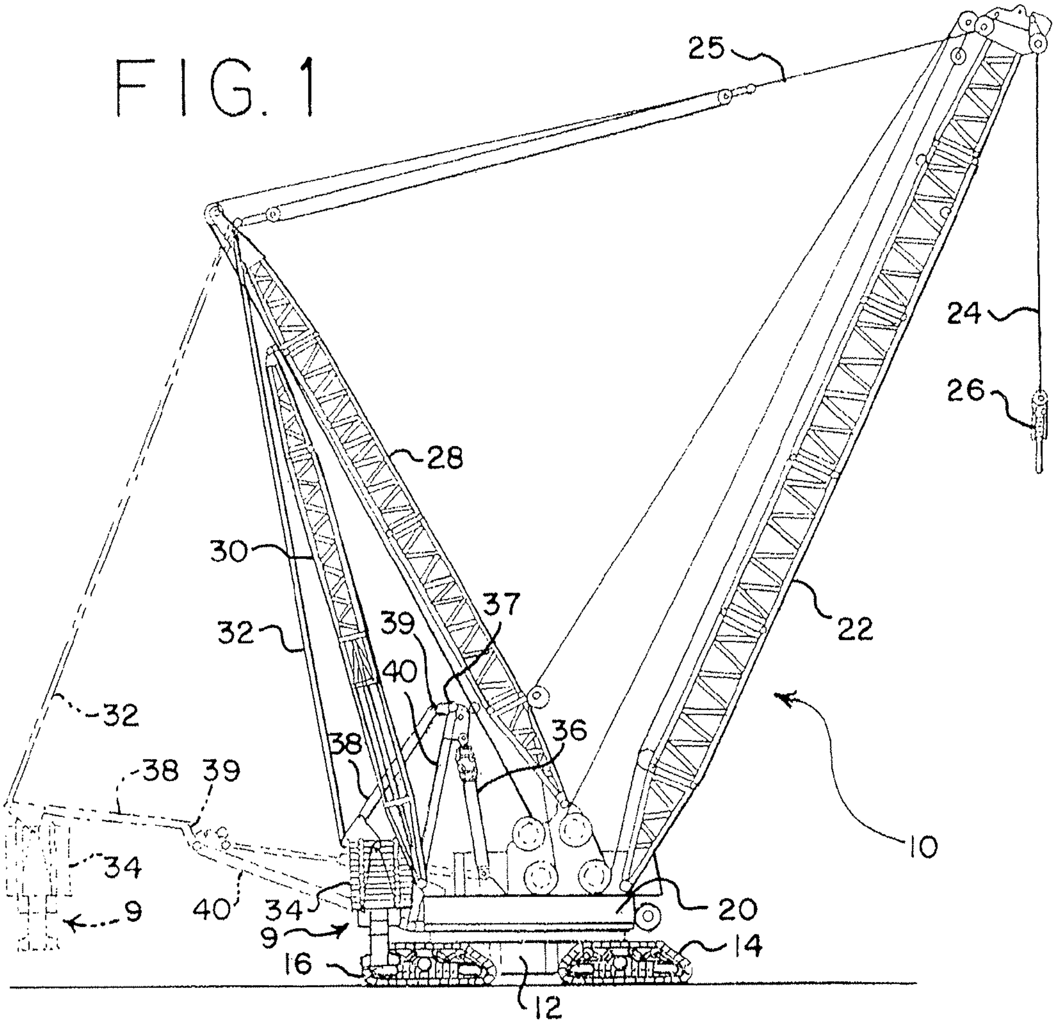
FIG. 1 is a side elevational view of a mobile lift crane using the present invention.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The preferred embodiment of the present invention relates to a high capacity mobile lift crane, other aspects of which are disclosed in U.S. Pat. No. 7,546,928 and the following co-pending United States patent applications assigned to the assignee of the present application: "Mobile Lift Crane With Variable Position Counterweight," Ser. No. 12/023,902, filed Jan. 31, 2008; "Mast Raising Structure And Process For High-Capacity Mobile Lift Crane," Ser. No. 11/740,726, filed Apr. 26, 2007; "Boom Hoist Transportation System And Crane Using Same," Ser. No. 61/098,632 filed Sep. 19, 2008; "Connection System For Crane Boom Segments," Ser. No. 12/273,310, filed Nov. 18, 2008; "Drive Tumbler And Track Drive For Mobile Vehicles, Including Lift Cranes," Ser. No. 12/368,143, filed Feb. 9, 2009; "Track Connection System For Mobile Vehicles, Including Lift Cranes," Ser. No. 12/368,125, filed Feb. 9, 2009; "Track Tensioning System For Mobile Vehicles, Including Lift Cranes," Ser. No. 12/368,113, filed Feb. 9, 2009; "Crane Hook Block," Ser. No. 61/155,455, filed Feb. 25, 2009; "Carbody Connection System and Crane Using Same," Ser. No. 61/155,440, filed Feb. 25, 2009; "Counterweight Block And Assemblies For Cranes," Ser. No. 61/158,599, filed Mar. 9, 2009; "Swing Drive System For Cranes," Ser. No. 61/155,414, filed Feb. 25, 2009; "Drum Frame System For Cranes," Ser. No. 61/155,401, filed Feb. 25, 2009; "Folding Jib Main Strut And Transportable Reeved Strut Caps," Ser. No. 61/165,403, filed Mar. 31, 2009; "Crane Boom Stop," Ser. No. 61/179,935, filed May 20, 2009; and "Crane Backstay Spreader", Ser. No. 61/179,983, filed May 20, 2009. Each of these applications is hereby incorporated by reference.

Several terms used in the specification and claims have a meaning defined as follows.

The term "carbody connector" designates the structure that is not normally permanently attached to the carbody by which the linear actuator is connected to the carbody. The carbody connector will typically be made of several parts, some of which are typically left attached to the linear actuator during a crane tear-down, transport and set-up operation, but some of which may be taken apart from the linear actuator and connected again during the set-up process. The term "carbody connector" may refer to several parts in the aggregate, but sometimes refers to just one of the major components in the structure.

The term "crawler frame connector" designates the structure that is not normally permanently attached to the crawler frame by which the linear actuator is connected to the crawler frame. The crawler frame connector will typically be made of several parts, some of which are typically left attached to the linear actuator during a crane tear-down, transport and set-up operation, but some of which may be taken apart from the linear actuator and connected again during the set-up process. The term "crawler frame connector" may refer to several parts in the aggregate, but sometimes refers to just one of the major components in the structure.

Figure 2:
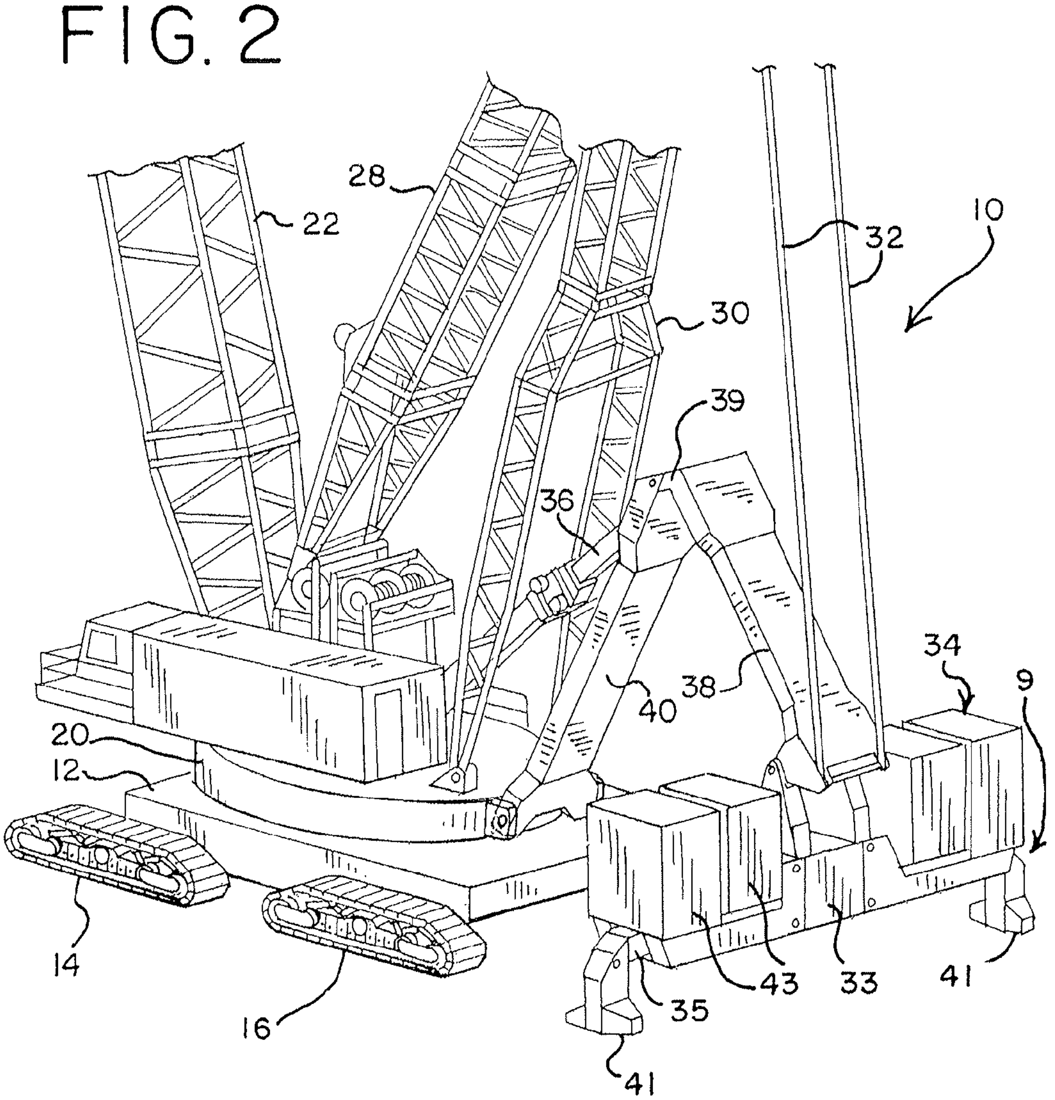
FIG. 2 is a perspective view of the crane of FIG. 1.

While the invention will have applicability to other types of construction equipment, it will be described in connection with mobile lift crane 10, shown in an operational configuration in FIGS. 1 and 2. The mobile lift crane 10 includes lower works, also referred to as a carbody 12, and moveable ground engaging members in the form of crawlers 14 and 16. There are of course two front crawlers 14 and two rear crawlers 16, only one each of which can be seen from the side view of FIG. 1. Of course additional crawlers than those shown can be used.

Figure 3:
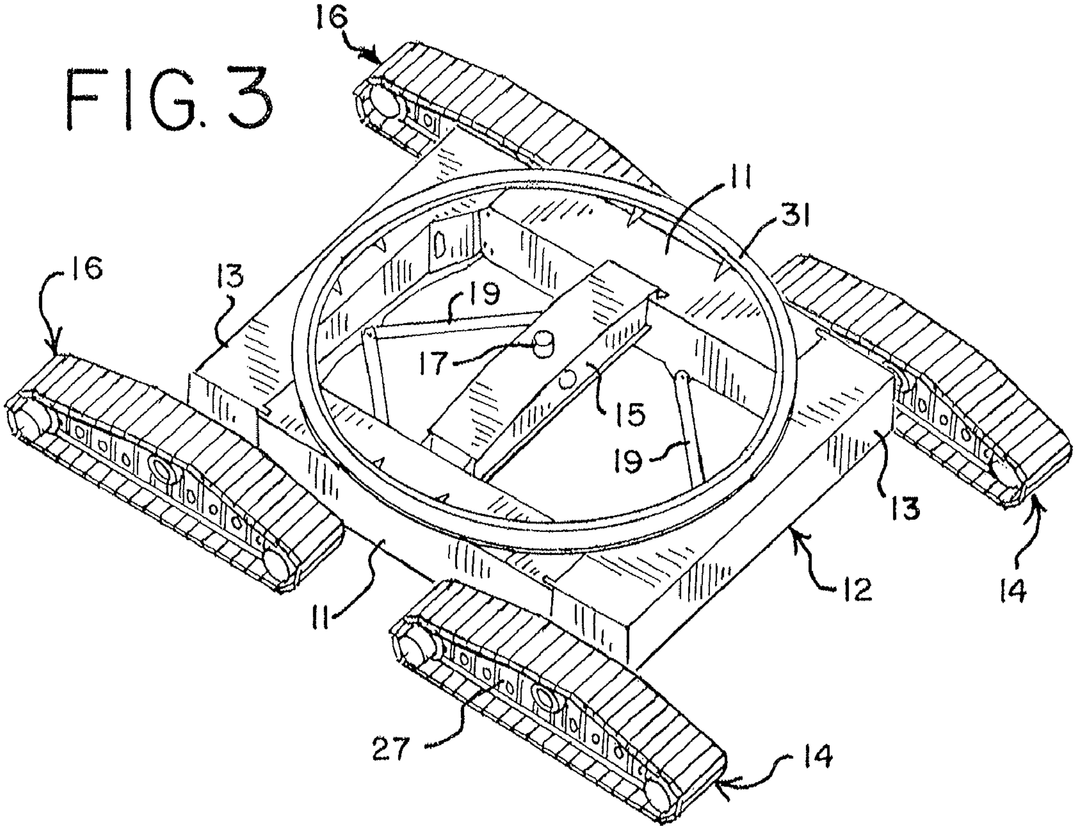
FIG. 3 is a perspective view of the carbody and crawlers used on the crane of FIG. 1.

A rotating bed 20 is rotatably connected to the carbody 12 such that the rotating bed can swing with respect to the ground engaging members. The rotating bed is mounted to the carbody 12 with a slewing ring 31, best seen in FIG. 3, such that the rotating bed 20 can swing about an axis with respect to the ground engaging members 14, 16. The rotating bed supports a boom 22 pivotally mounted on a front portion of the rotating bed; a mast 28 mounted at its first end on the rotating bed; a backhitch 30 connected between the mast and a rear portion of the rotating bed; and a moveable counterweight unit 34 having counterweights 43 on a support member 33. The counterweights may be in the form of multiple stacks of individual counterweight members on the support member 33. (FIG. 2 is simplified for sake of clarity, and does not show the full lengths of the boom, mast, and backhitch.)

Boom hoist rigging 25 between the top of mast 28 and boom 22 is used to control the boom angle and transfers load so that the counterweight can be used to balance a load lifted by the crane. A load hoist line 24 extends from the boom 22, supporting a hook 26. The rotating bed 20 may also includes other elements commonly found on a mobile lift crane, such as an operator's cab and hoist drums for the rigging 25 and load hoist line 24. If desired, the boom 22 may comprise a lulling jib pivotally mounted to the top of the main boom, or other boom configurations. The backhitch 30 is connected adjacent the top of the mast 28, but down the mast far enough that it does not interfere with other items connected to the mast. The backhitch 30 may comprise a lattice member designed to carry both compression and tension loads as shown in FIG. 1. In the crane 10, the mast is held at a fixed angle with respect to the rotating bed during crane operations, such as a pick, move and set operation.

The counterweight unit is moveable with respect to the rest of the rotating bed 20. A tension member 32 connected adjacent the top of the mast supports the counterweight unit in a suspended mode. A counterweight movement structure is connected between the rotating bed and the counterweight unit such that the counterweight unit may be moved to and held at multiple positions, including a first position in front of the top of the mast (shown in solid lines in FIG. 1), and a second position rearward of the top of the mast (shown in dashed lines in FIG. 1).

At least one linear actuation device, in this embodiment a rack and pinion assembly 36, and at least one arm pivotally connected at a first end to the rotating bed and at a second end to the a rack and pinion assembly 36, are used in the counterweight movement structure of crane 10 to change the position of the counterweight. The arm and a rack and pinion assembly 36 are connected between the rotating bed and the counterweight unit such that extension and retraction of the rack and pinion assembly 36 changes the position of the counterweight unit compared to the rotating bed. FIG. 2 shows the rack and pinion assembly 36 partially extended, which moves the counterweight unit to a mid-position, such as when a load is suspended from the hook 26.

A pivot frame 40, a solid welded plate structure, is connected between the rotating bed 20 and the second end of the rack and pinion assembly 36. The backhitch 30 has an A-shape configuration, with spread apart lower legs, which allows the counterweight movement structure to pass between the legs when needed. The rear arm 38 is connected between the pivot frame 40 and the counterweight unit. A set of pins 37 are used to connect the rear arm 38 and the pivot frame 40. The rear arm 38 is also a welded plate structure with an angled portion 39 at the end that connects to the pivot frame 40. This allows the arm 38 to connect directly in line with the pivot frame 40.

The crane 10 is equipped with a counterweight support system 9, which may be required to comply with crane regulations in some countries, even though the counterweight is never set on the ground during a pick, move and set operation. Because the counterweight unit 34 can move far forward with respect to the front of the rotating bed, the counterweight supports on the support system may interfere with swing operations unless they are sufficiently spaced apart. However, this makes the support structure itself very wide. The crane 10 thus uses a counterweight support structure attached to the counterweight unit that includes a telescoping counterweight support system.

The counterweight support system 9 includes at least two ground engaging members in the form of support feet 41 that can provide support to the counterweight in the event of a sudden release of the load. The support system comprising a telescoping structure 35 connected to and between the ground engaging members 41 such that the distance between the ground engaging members 41 can be adjusted. The counterweight unit 34 is constructed so that the counterweight support system 9 can be removed and the crane can function both with and without it.

The counterweight movement structure and counterweight support structure are more fully disclosed in U.S. patent application Ser. No. 12/023,902, entitled "Mobile Lift Crane With Variable Position Counterweight," incorporated herein by reference.

As best seen in FIGS. 3, 3A, 3B, 3C and 4, the lift crane 10 comprises a carbody 12 made from two side members 11 and two end cross members, namely front and rear carbody beam assemblies 13. Each side member 11 is connected to each end cross member 13 with a carbody connection that can be disconnected such that the side members 11 and end cross members 13 can be individually transported between job sites and reassembled at a new job site. The carbody 12 further comprises a central cross member 15 that may also be disassembled from the side members 11 and end cross members 13. The central cross member 15 includes a king pin 17 on which the rotating bed is pivotally mounted such that the rotating bed 20 can swing with respect to the crawlers 14, 16. Diagonal braces 19 are connected to the central cross member 15 and the other carbody members. The carbody side members 11 are preferably equipped with jacks that allow the carbody to be raised so that the crawlers can be connected after the carbody members are connected together. The roller path and ring gear making up slewing ring 31 is preferably integrated with the carbody members to reduce assembly time.

Each side member 11 is connected to each end cross member 13 with a carbody connection that comprises at least one first vertical flange and at least two second vertical flanges spaced apart by a distance greater than the thickness of the first vertical flange such that the first flange fits between the second flanges when the carbody members are connected. Each of the first and second flanges has a base connected to their respective side member 11 or end cross member 13 to which they are attached, and a protruding front surface. As shown in the present embodiment, the carbody connections on the end cross members 13 each comprise two vertical first flanges 142 and 144, and the carbody connections on the side members 11 comprise four vertical second flanges 161, 162, 163 and 164. Each of the first and second vertical flanges have two horizontal holes through the flanges sized and spaced so that when the first vertical flange is placed between the second vertical flanges, the holes allow two pins to be placed through the flanges, connecting the side member to the end cross member. First vertical flanges 142 and 144 on the end cross member 13 include bottom holes 146 and top holes 148. The second vertical flanges 161-164 on side member 11 have similar holes. Each carbody connection is thus made by inserting four pins 168 through the holes in the first and second vertical flanges.

Side members 11 are preferably interchangeable with each other. End cross members 13 are also preferably interchangeable with each other when making the carbody. To make the carbody 12, a first side member 11 and a first end cross member 13 are first oriented so that they are spaced apart longitudinally but are at the same relative vertical position with respect to one another that they will be once connected to form the carbody. The first side member and first end cross member are then moved only horizontally into a connected position. Next the first side member is secured to the first end cross member. Finally the second side member 11 and second end cross member 13 are connected to the combined first side member and first end cross member. The step of connecting the second side member and second end cross member to the combined first side member and first end cross member preferably comprises placing the second side member and combined first side member and first end cross member so that they are spaced apart longitudinally but are at the same relative vertical position with respect to one another that they will be once connected to form the carbody, and moving the second side member only horizontally into a connected position. The step of connecting the second side member and second end cross member to the combined first side member and first end cross member preferably further comprises placing the second end cross member and combined first side member, second side member and first end cross member so that they are spaced apart longitudinally but are at the same relative vertical position with respect to one another that they will be once connected to form the carbody, and moving the second end cross member only horizontally into a connected position. Of course the central cross member 15, including a king pin on which the rotating bed is pivotally mounted, is connected to the connected first and second side members and first and second end cross members. Preferably the step of securing the first side member to the first end cross member further comprises connecting a diagonal brace 19 between midpoints of the first side member and the first end cross member.

To help align the holes in the first and second vertical flanges, and thus quickly connect the carbody members together, the preferred carbody connection system includes a locating feature. Either the first or second flanges include a notch formed in the protruding front surface of the flange at an elevation between the elevation of the two holes, and the other of the first or second flanges include a pin captured in the protruding front surface at an elevation between the elevations of the two holes. In the embodiment shown, the notch 145 is provided in the first vertical flanges 142 and 144, and the captured pin 165 spans between pairs of the two second vertical flanges, one between flanges 161 and 162, and another between flanges 163 and 164. The depth of the notch 145, the position of the pin 165 and the respective elevations of the pins and notches cooperate so that when the side member 11 is brought together with the end cross member 13, the pins 165 fit in the notches 145, and the holes in the flanges are aligned. A hydraulic cylinder 186 (FIG. 3C) mounted between bracket 152 on the end cross member 13 and bracket 154 on the side member 11 can be activated to help pull the members 11 and 13 into position for insertion of the pins 168. Two pins are then inserted through holes in carbody connection structures of the fist side member and the first end cross member that are aligned in the operational position, to secure the fist side member to the first end cross member. Further, hydraulic pin pushers are preferably mounted on the side members 11 adjacent each of the four pins 168 to hydraulically push the pins through the holes in the first and second vertical flanges.

The crawlers 14 and 16 each have at least one, and preferably two, drive tumblers 23 (FIG. 4) supported on the crawler frame 27; and a track made of a plurality of connected track shoes 29, each having a ground engaging surface and an inside surface opposite the ground engaging surface. The track is wrapped around the drive tumblers 23 so that a plurality of the shoes are in contact with the drive tumblers and the track passes around the frame. Other details of a preferred crawler, while not crucial to the present invention, are disclosed in the following patent applications: "Drive Tumbler And Track Drive For Mobile Vehicles, Including Lift Cranes," Ser. No. 12/368,143, filed Feb. 9, 2009; "Track Connection System For Mobile Vehicles, Including Lift Cranes," Ser. No. 12/368,125, filed Feb. 9, 2009; and "Track Tensioning System For Mobile Vehicles, Including Lift Cranes," Ser. No. 12/368,113, filed Feb. 9, 2009.

Figure 4:
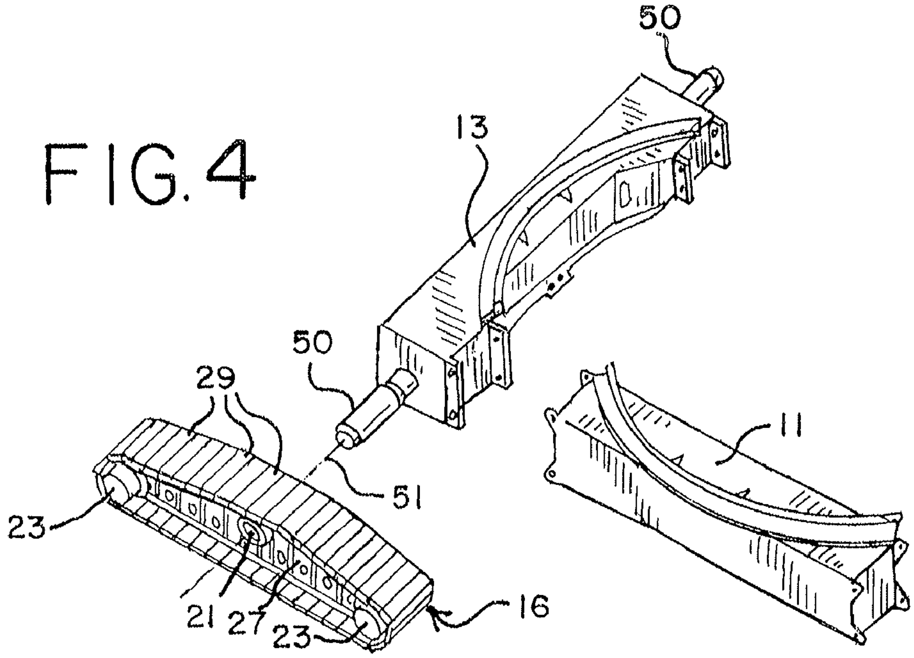
FIG. 4 is a perspective exploded view of a side member and an end cross member and one crawler of the crane of FIG. 1.
Figure 3A:
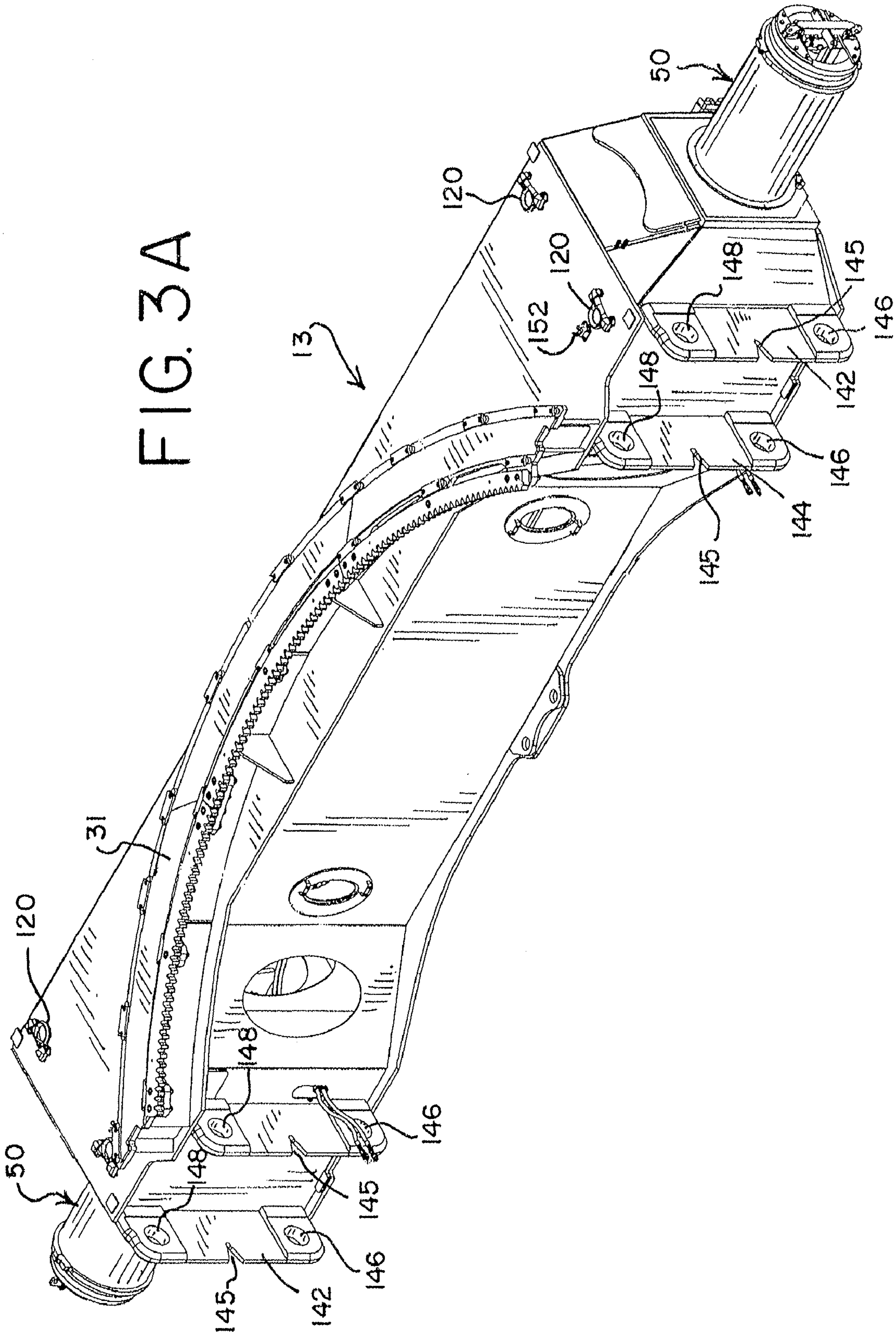
FIG. 3A is a perspective view of an end cross member making up the carbody used on the crane of FIG. 1.
Figure 6:
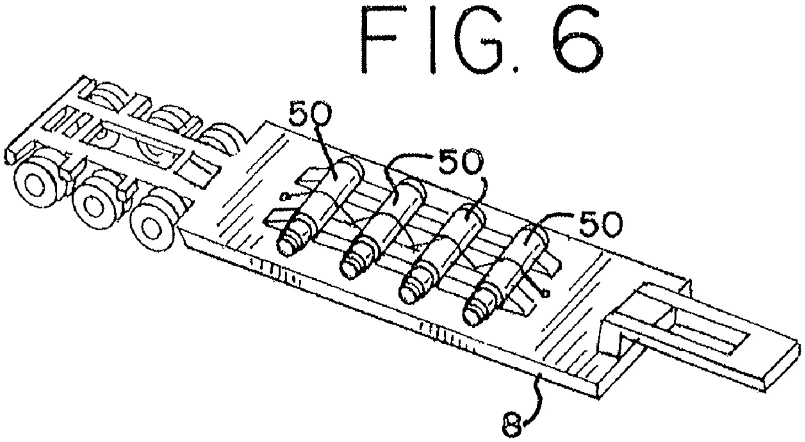
FIG. 6 is a perspective view of four trunnions of the crane of FIG. 1 on a transport trailer for transport separately from the crawler or carbody members.
Figure 7:
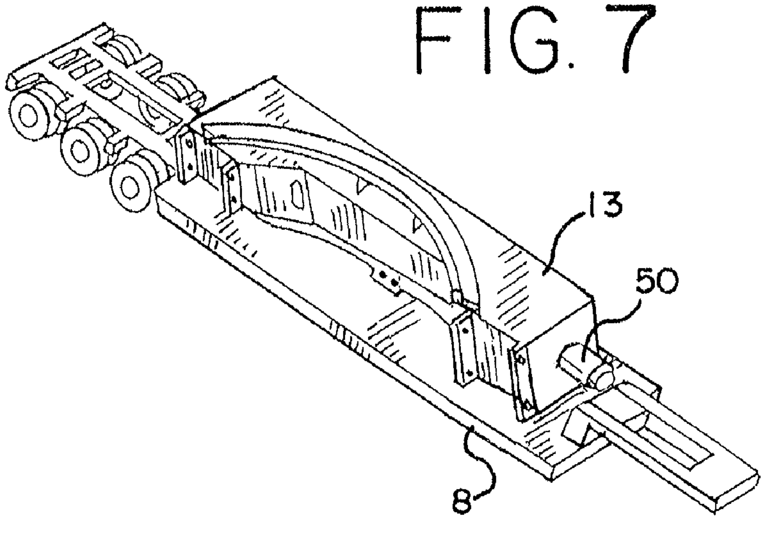
FIG. 7 is a perspective view of a combined carbody beam and trunnion assembly of the crane of FIG. 1 on a transport trailer.

As seen in FIG. 4, a trunnion 50 connects the crawler frame 27 to the carbody 12. The trunnion 50 can be installed in the front and rear carbody beam assemblies 13, and also fits within a hole 21 in the crawler frame 27. The trunnion 50 has a longitudinal axis 51. The crawler frame 27 is attached to the carbody 12 so as to be able to pivot with respect to the carbody 12 about the axis 51. As noted above, the trunnion 50 can be transported by itself on a transport trailer 8, in which case all four trunnions 50 used on the crane may be transported on the same trailer (FIG. 6); or it may be transported while connected to a crawler 14, 16 (FIG. 5); or it may be transported while installed in either the front or rear carbody beam assemblies 13 (FIG. 7). Of course one or more of the separate trunnions 50 may be transported on the same trailer 8 as other crane components, so long as maximum weight limits are observed.

FIGS. 8-19 show details of the trunnion 50, how it connects to the carbody beam assembly 13 and the crawler frame 27, and how it is installed into either the carbody beam assembly or crawler, and how the whole arrangement looks in its working configuration. FIGS. 20-34 show individual components used to make up the trunnion assembly and its connections to the carbody and to the crawler frame. As noted above, the trunnion can be installed first into the carbody beam assembly 13, and then the crawler attached, or the trunnion may be installed in the crawler, and then the crawler and trunnion combination attached to the carbody. Also, when attached to the crawler, the trunnion can be attached in its working position (FIGS. 13, 14 and 16), or in a transport position (FIGS. 11 and 12), where the width of the combined crawler and trunnion is reduced to meet transport dimension limitations.

The trunnion 50 has two major components, a main hollow central tubular member 52 and a self attachment mechanism that includes a linear actuator, preferably a hydraulic cylinder. The trunnion assembly also includes a longitudinal cylinder guide 59 and end brackets 110 and 112, discussed in more detail below.

Figures 8, 9, 10:
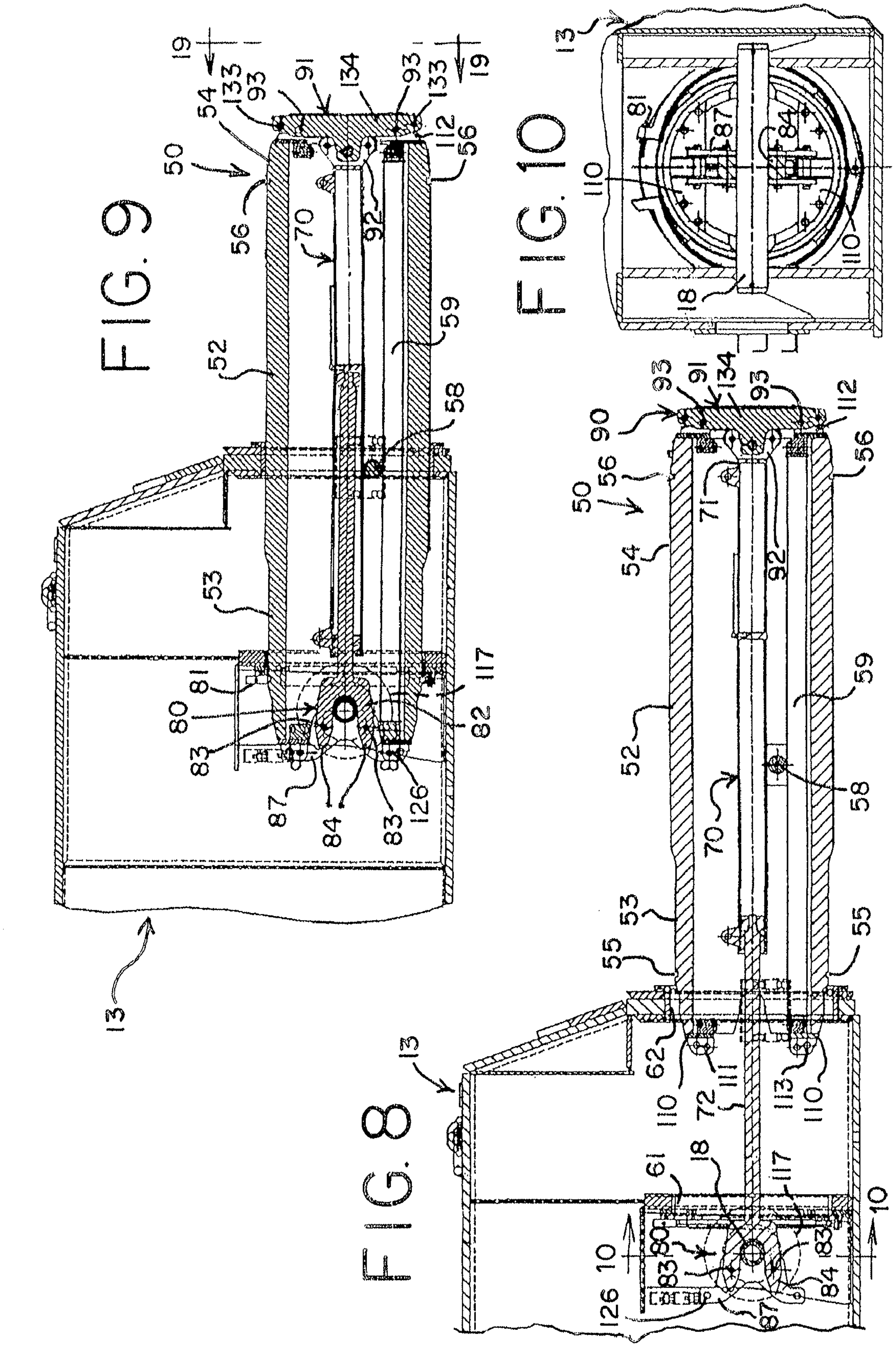
FIG. 8 a cross-sectional view of the trunnion and carbody member of the crane of FIG. 1 showing the assembly as the trunnion is either being installed in or removed from the carbody member.
FIG. 9 is a cross-sectional view of a trunnion as installed in a carbody member of the crane of FIG. 1.
FIG. 10 is a cross-sectional view taken along line 10-10 of FIG. 8.

When the crane is first set up, the linear actuator is connected between the crawler frame and the carbody and extends through the main hollow central tubular member 52. The tubular member 52, with longitudinal axis 51, has a first end 53 configured for connection to a crane carbody and a second end 54 configured for connection to a crawler frame. FIG. 20 shows the tubular member 52. Preferably the end 53 is configured to be captured in the carbody in a fixed position, while end 54 is configured to allow rotational movement of the crawler frame 27 relative to the trunnion, and hence relative to the carbody 12 about the longitudinal axis 51. Of course the first end 53 could be configured for a rotatable connection in the carbody to provide the relative rotational movement of the crawler about the axis 51. The first end 53 has a smaller outside diameter than the middle of the tubular member 52. As seen in FIGS. 8 and 9, the smaller diameter section is just slightly smaller than a first mounting hole 61 inside the carbody beam assembly 13. The central section diameter is just slightly smaller than the outer mounting hole 62 in carbody beam assembly 13. The tubular member 52 includes a notch 57 in both sides of the first end 53 that is used to prevent the tubular member from rotating, as explained below.

Figure 17:
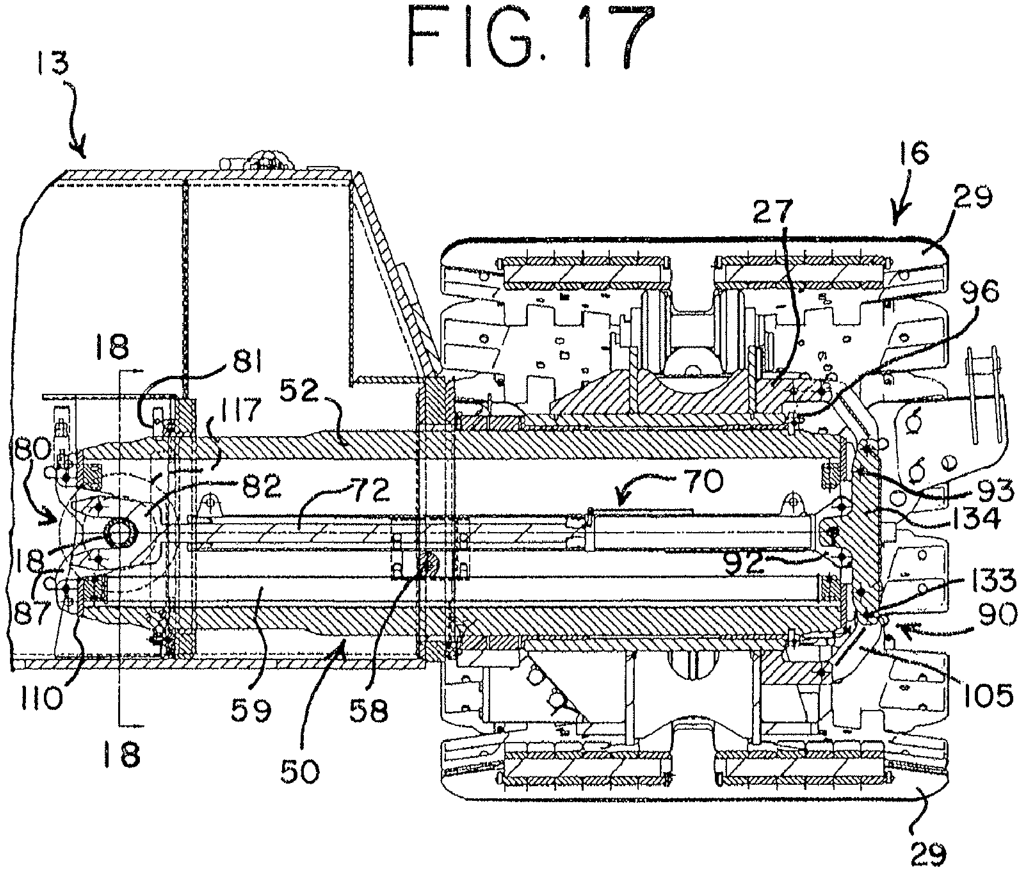
FIG. 17 is a cross-sectional view like FIG. 9 but showing the crawler in place on the trunnion, with the crawler and carbody in a working position.
Figure 18:
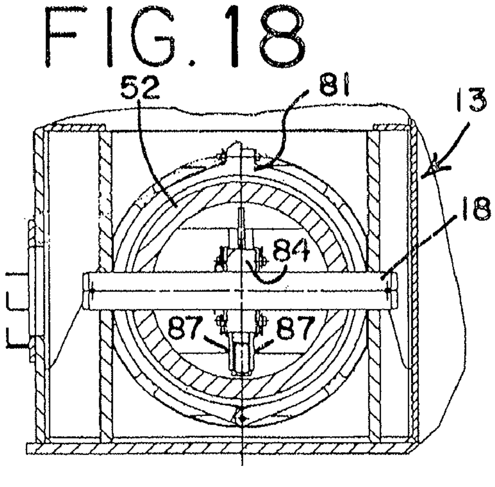
FIG. 18 is a cross-sectional view taken along line 18-18 of FIG. 17.
Figure 19:
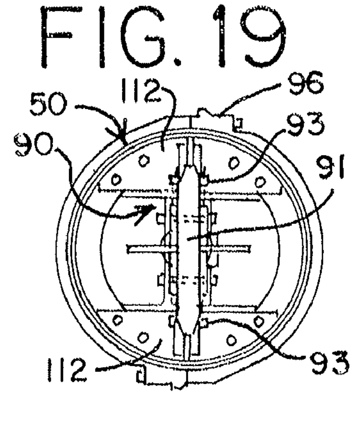
FIG. 19 is an end elevational view taken along line 19-19 of FIG. 9 but showing only the trunnion components.
Figure 17A:
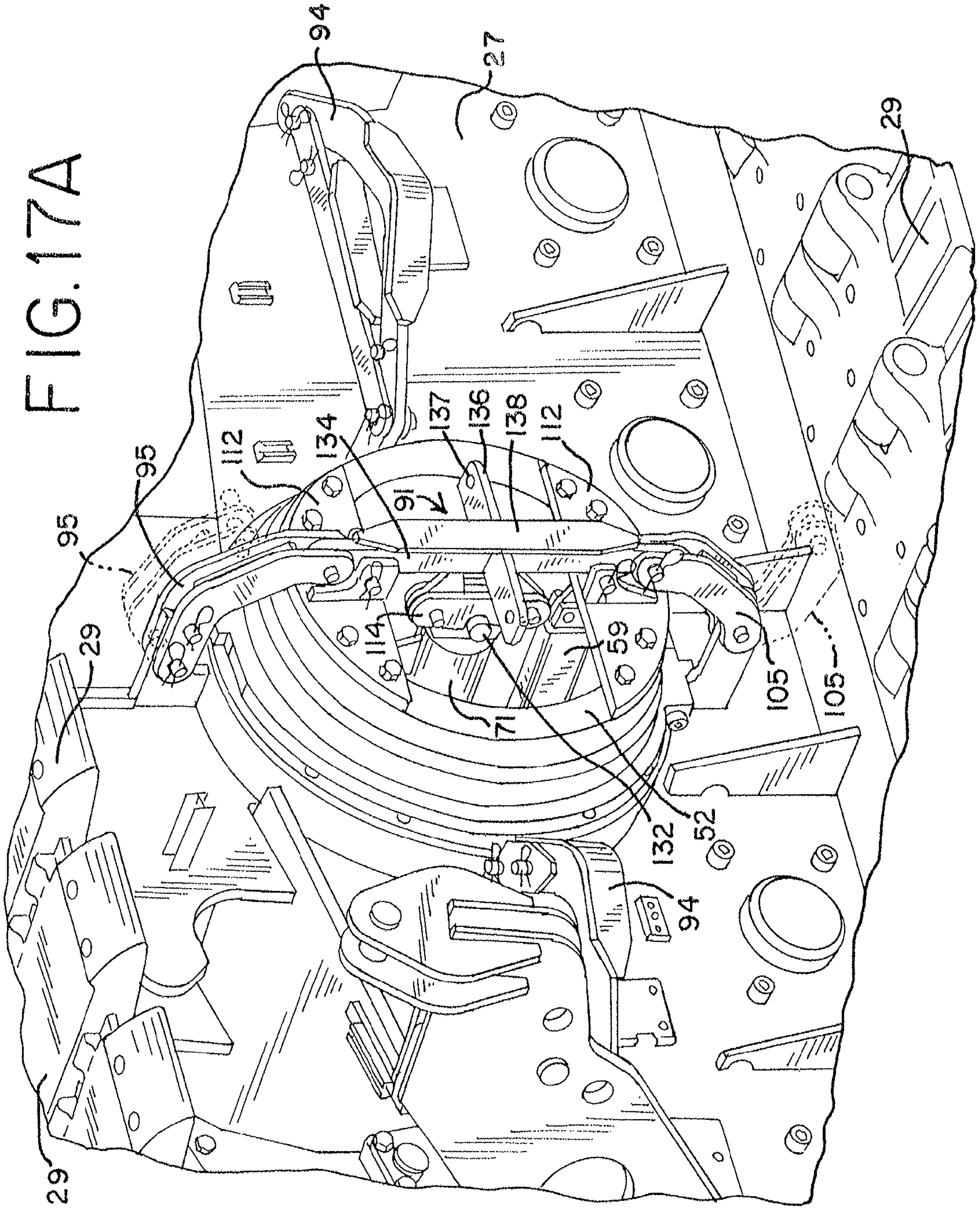
FIG. 17A is a perspective, partially broken away view of the trunnion installed in the crawler frame as in FIG. 17.
Figure 25:
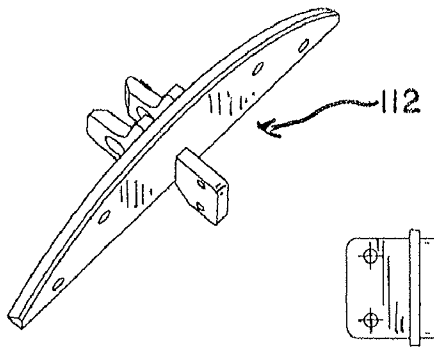
FIG. 25 is a perspective view of a bracket attached to the end of the trunnion tubular member at the crawler frame end.
Figure 26:
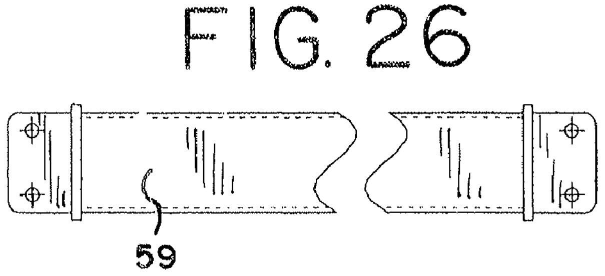
FIG. 26 is a side elevational view, partially broken, of the longitudinal cylinder guide used in the trunnion assembly of FIG. 9.
Figure 27:
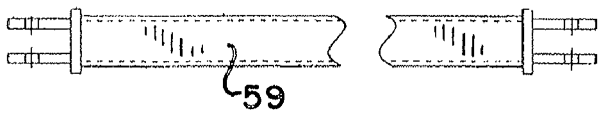
FIG. 27 is a top plan view, partially broken, of the longitudinal cylinder guide of FIG. 26.
Figure 28:
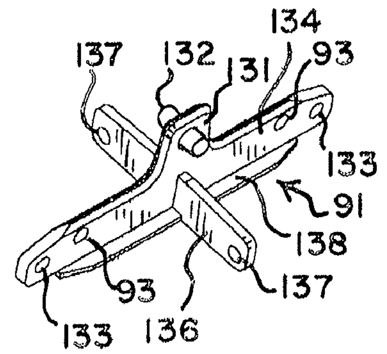
FIG. 28 is a perspective view of the transverse member portion of the crawler frame connector of FIG. 9.

Two brackets 110 (FIG. 24) are bolted to the first end of the tubular member 52 (FIG. 9A), and two brackets 112 (FIG. 25) are bolted to the second end of the tubular member 52 (FIG. 17A). These brackets are used to connect other elements to the tubular member 52. The brackets 110 are made to be identical, even though only one of them is used to mount the longitudinal cylinder guide 59 (FIGS. 26 and 27) inside the tubular member, and thus uses the inside mounting flange. However, making them identical is preferable from a manufacturing standpoint. Likewise the two brackets 112 are identical to each other. Brackets 110 have two holes on the outside mounting flanges. The lower hole is used to connect to retaining plate 87. The upper hole 113 (best seen in FIG. 9A) is simply a burned hole that can be used to connect onto and lift the trunnion 50.

The self attachment mechanism is preferably hydraulically-operated, and preferably includes a hydraulic cylinder 70 mounted within tubular member 52. The hydraulic cylinder 70 has a bore 101 (see FIGS. 21 and 22), a piston 102 mounted in the bore and forming a piston end 71 of the cylinder, and a rod 72 connected to the piston opposite the piston end and extending out of an exit end of the bore, thus forming a rod end of the cylinder. The stroke of the cylinder 70 does not need to be the full length of the trunnion tube, so the piston end of the cylinder has a spacer 103 built into it, closed off by an end member 104. Hydraulic fluid enters the bore 101 through line 107 to act against the piston 102 and extend the rod 72, with hydraulic fluid in the bore on the rod end of the cylinder exiting through hydraulic line 106. When the cylinder is to be retracted, fluid is forced in through line 106, and exits out line 107. The cylinder is provided with hook lugs 108 on its exterior to help in lifting the cylinder 70 during assembly into the trunnion.

A carbody connector 80 is attached to the rod end of the hydraulic cylinder, and a crawler frame connector 90 is attached to the piston end of the hydraulic cylinder 70. These could of course be reversed, with the carbody connector 80 attached to the piston end 71 of the hydraulic cylinder. In the arrangement shown in FIG. 9, the first end 53 of the tubular member 52 is detachably connected to the carbody 12, and the rod end of the hydraulic cylinder is also connected to the carbody 12 through the carbody connector 80. After the crawler is installed, as discussed below and as shown in FIG. 17, the second end 54 of the trunnion is detachably connected to the crawler frame 27, and the piston end 71 of the hydraulic cylinder is connected to the crawler frame 27 adjacent the second end of the trunnion though the crawler frame connector 90. The tubular member 52 includes a first circumferential groove 55 in the outer surface of the tubular member configured to receive a retaining ring 81 (FIGS. 9A and 29) to hold the trunnion in place within the carbody beam assembly 13. The tubular member 52 also includes a second circumferential groove 56 in the outer surface of the tubular member adjacent the second end, also configured to receive a retaining ring 96 (FIG. 30), as explained below. The hydraulic cylinder 70 is connected to a roller 58 that can roll along the longitudinal cylinder guide 59 secured to the inside of the trunnion tubular member 52.

Figure 9A:
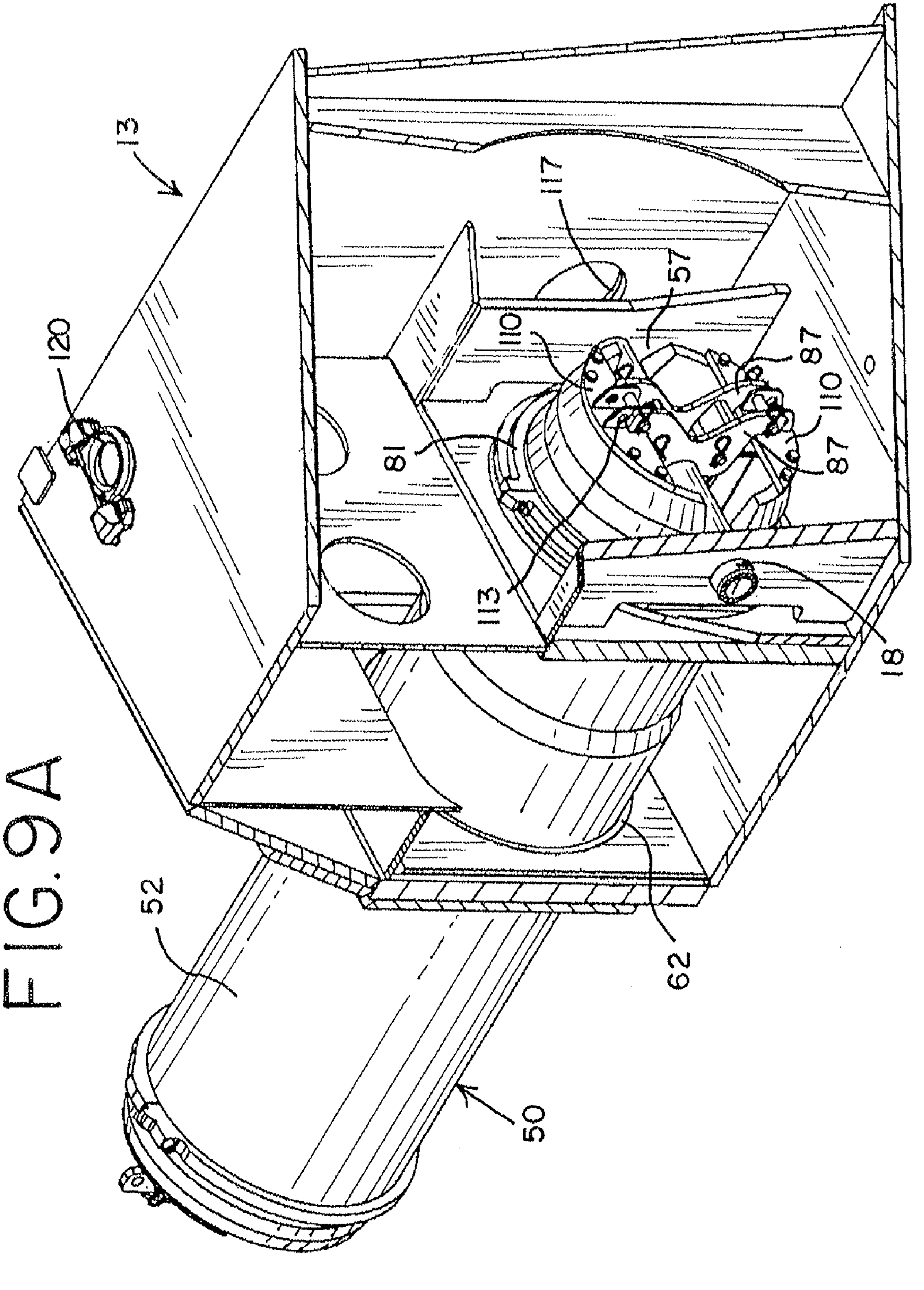
FIG. 9A is a perspective, partially cross-sectional view of the trunnion installed in the carbody member of FIG. 9.

The carbody connector 80 is used to connect the hydraulic cylinder to the carbody for certain operations. Otherwise the carbody connector can be secured to the first end of the trunnion tubular member 52. The preferred connector 80 comprises a clevis member 82 attached at a first end to the hydraulic cylinder rod 72, the clevis having two extensions 84 each having a hole 83 for connecting the clevis to the carbody. When the carbody connector 80 is connected to the carbody beam assembly 13, the extensions 84 of the clevis member 82 surround a tubular member 18 that is secured between plates within the carbody cross beam assembly 13 (see FIGS. 9A, 10 and 18). The notches 57 in the trunnion tubular member 52 also extend around the tubular member 18, thus preventing the tubular member 52 from rotating. Pins are placed through the holes 83 in the clevis member 82 and holes 122 in retaining plates 87 (FIG. 23) to pin the clevis member 82 and retaining plates 87 together. The retaining plates 87 also have a half circular notch 124 that fits against the back side of tubular member 18 (FIG. 9A), thus securing the rod end of the cylinder to the carbody beam assembly 13. Holes 126 in ears 128 of retaining plates 87 are used to connect the retaining plates 87 to the holes 111 in the mounting flange on brackets 110, thus further securing the trunnion tubular member 52 to the tubular member 18 and thus the rest of the carbody beam assembly 13. FIG. 9A shows the location of a lifting lug 120 welded to the top of the carbody beam assembly 13, and an access hole 117 that is made in the plate material of the carbody beam assembly to get access to where holes are machined to insert tubular member 18.

When the carbody connector 80 is not connected to the carbody, the holes 83 are still used to pin the connector 80 to retaining plates 87, which in turn are pinned to brackets 110, allowing the connector 80 to be connected to the first end of the trunnion tubular member 52, thus allowing the hydraulic cylinder to push off against the first end 53 of the trunnion so as to extend the piston end of the hydraulic cylinder out of the second end of the trunnion tubular member 52.

Alternatively, as shown in FIG. 8, the retaining plates 87 and clevis 82 can be pinned together around tubular member 18 and be unpinned from the brackets 110, thus allowing the trunnion to be pulled into or pushed out of the carbody beam assembly 13 using the hydraulic cylinder 70.

Figure 34:
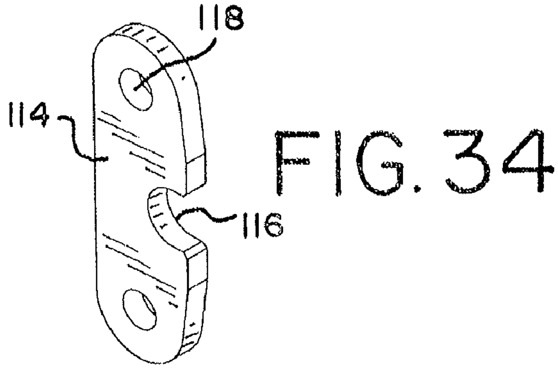
FIG. 34 is a perspective view of a retainer used to connect the transverse member and captured pin to the piston end of the hydraulic cylinder as shown in FIG. 17A.

The preferred crawler frame connector 90 is made of several components, including a clevis member 92 (FIGS. 21 and 22) connected at the piston end 71 of the hydraulic cylinder 70, a transverse member 91 (FIG. 28), and retainers 114 (FIG. 34). Retainers 114 have a center notch 116 and two holes 118. The clevis member 92 has a different clevis shape than clevis member 82, and is formed from two parallel plates with holes 97 in them.

The transverse member 91 has a main member 134, a cross member 136 and a backing member 138 helping to secure the cross member 136 to the main member 134. The main member 134 has an extension 131 in its central region with a hole with a captured pin 132 in the hole. The main member also includes an inner pair of holes 93 and an outer pair of holes 133. The cross member 136 also includes a pair of holes 137. Holes 93 are used to secure the crawler frame connector 90 to the second end 54 of tubular member 52 by connecting the transverse member 91 to brackets 112 and thus to the trunnion tubular member 52. Holes 133 and 137 are used to pin the transverse member 91 to the crawler frame through various links.

Figure 11:
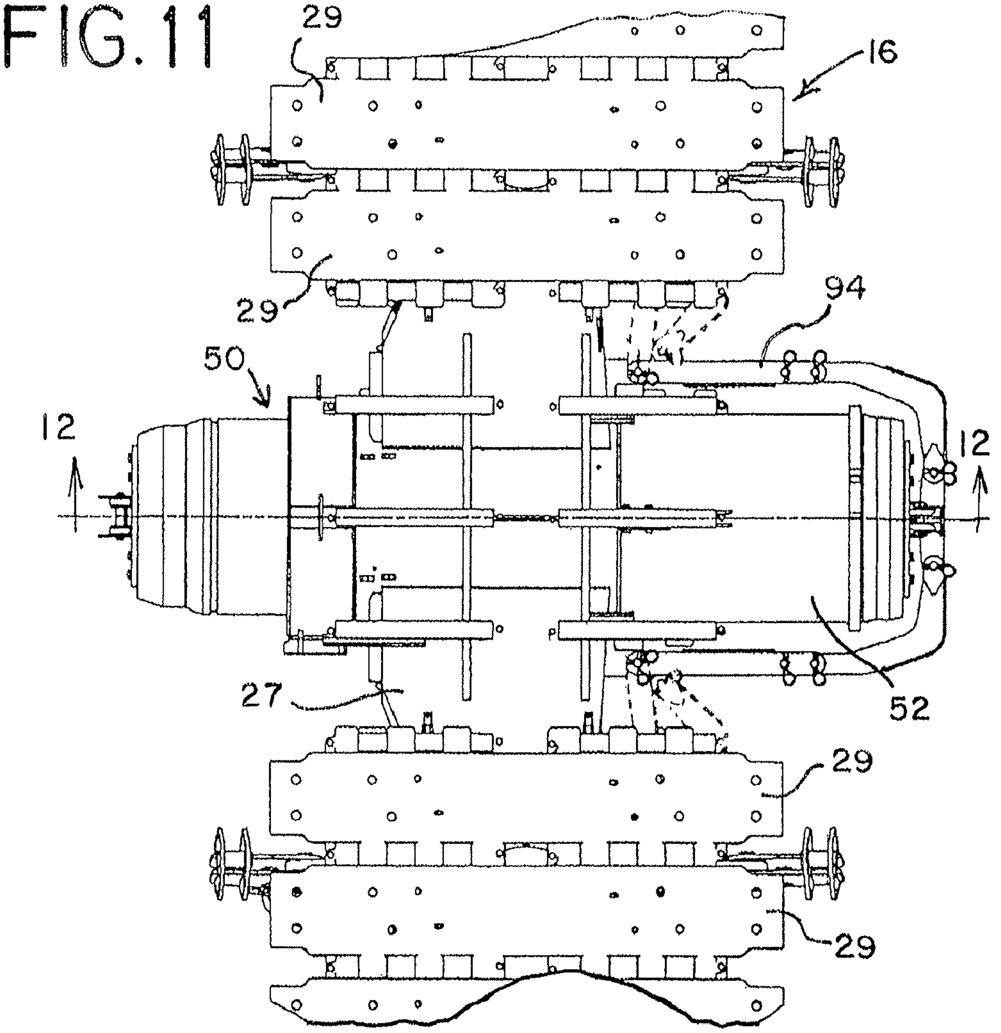
FIG. 11 is a top plan view, partially broken away, of the crawler and trunnion assembly used on the crane of FIG. 1 in a transport mode, as shown in FIG. 5.
Figure 12:
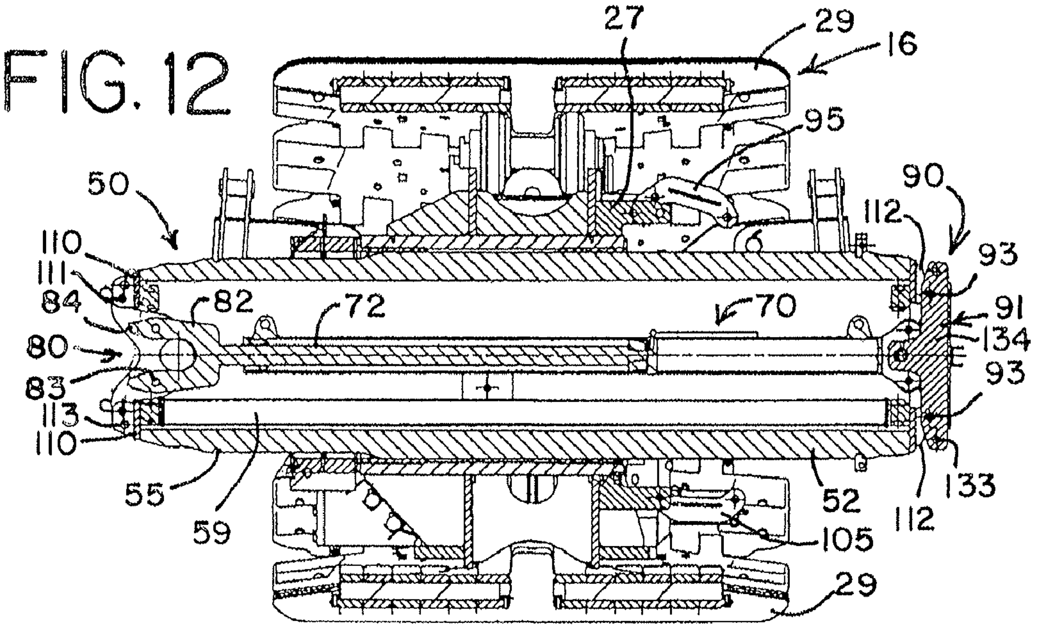
FIG. 12 is a cross-sectional view taken along line 12-12 of FIG. 11.
Figure 15:
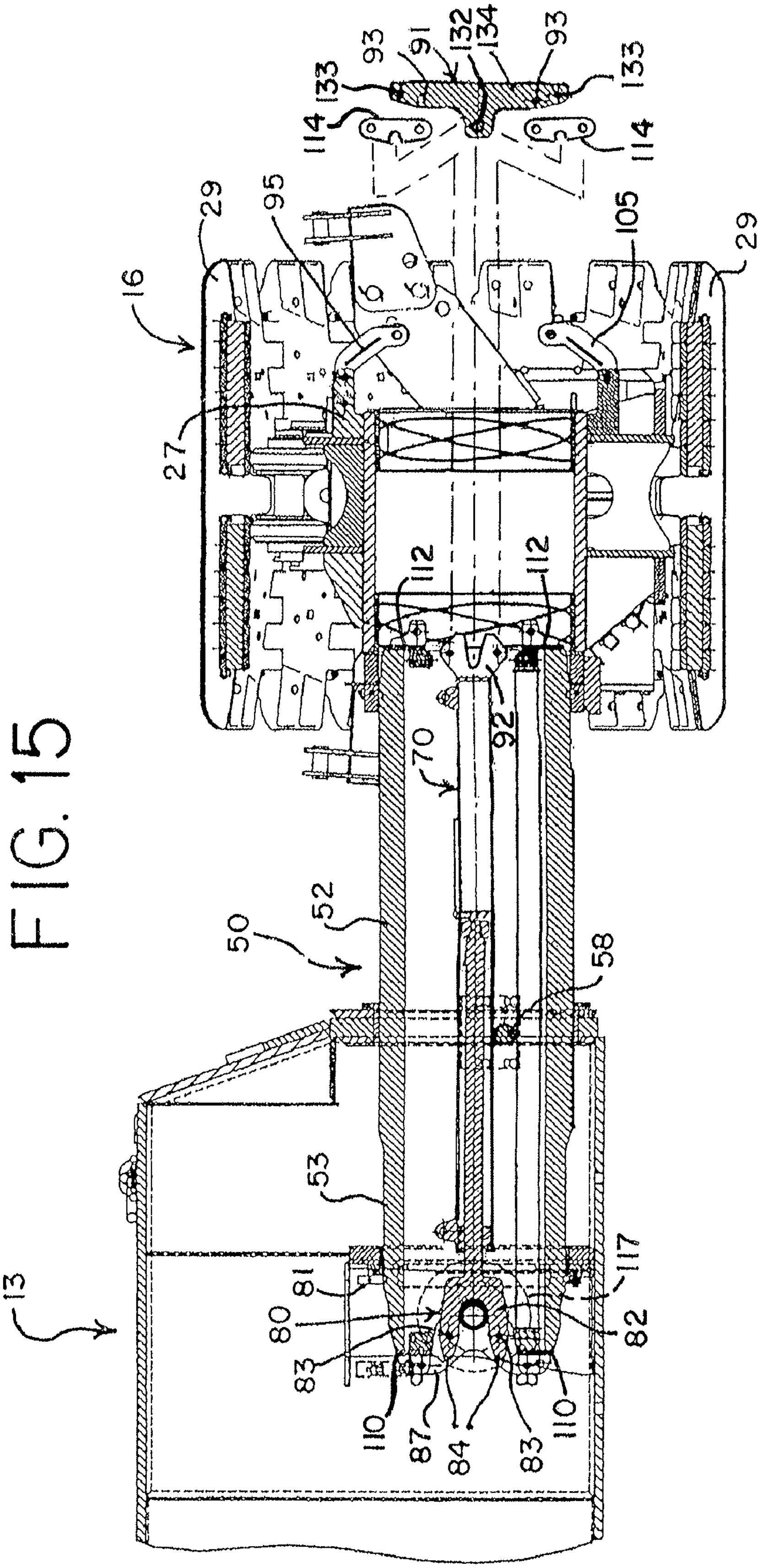
FIG. 15 is a cross-sectional and partially exploded view like FIG. 9 but showing a first step in the crawler being assembled to the trunnion already in place in the carbody.
Figure 16:
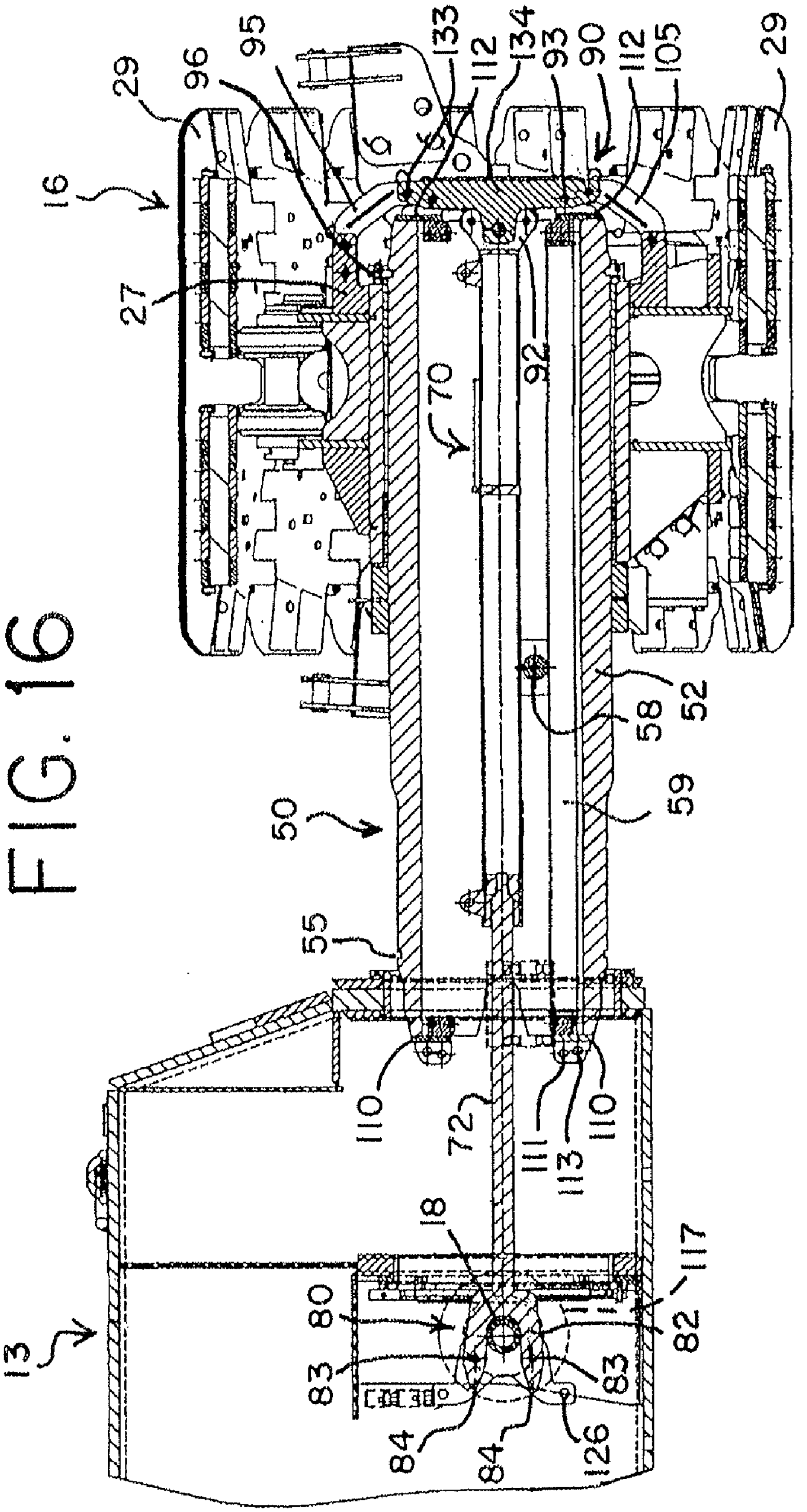
FIG. 16 is a cross-sectional view like FIG. 8 but showing the combined crawler and trunnion being assembled to the carbody.
Figure 32:
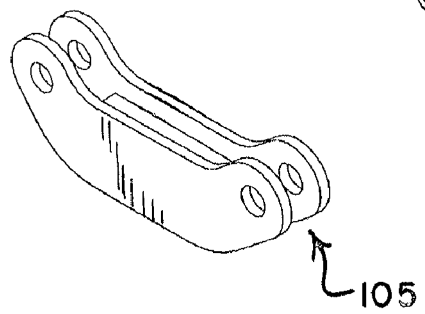
FIG. 32 is a perspective view of a bottom short link used to connect the trunnion assembly to the crawler frame to move it into a working position, as shown in FIG. 17.
Figure 33:
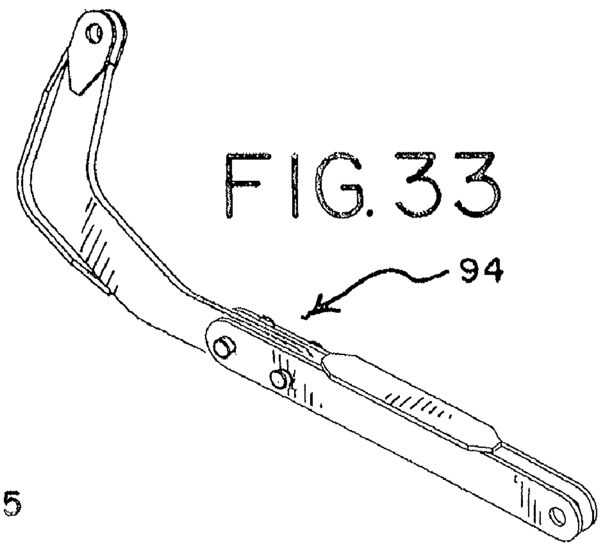
FIG. 33 is a perspective view of a two part link that together forms the long link used to connect the trunnion assembly to the crawler frame in a transport position, as shown in FIG. 11.

Two sets of links are used, depending on where the crawler frame 27 is in relation to the trunnion 50. In the position of FIGS. 11 and 12, two identical long horizontal links 94 (FIG. 33) are used. In the position of FIGS. 15 and 16, two slightly different short links are used, top link 95 (FIG. 31) and bottom link 105 (FIG. 32).

The crawler frame connector 90 is assembled by placing the captured pin 132 of transverse member 91 in the notch of clevis 92. Two retainers 114 are then placed parallel to and on opposite sides of main member 134 so that their center notch 116 fits around captured pin 132 from the back side. Pins are placed through holes 118 of retainers 114 and holes 97 of the clevis member 92. This secures the transverse member 91 to the hydraulic cylinder with a pivotal connection about pin 132. The transverse member 91 is thus connected at its central portion to the second end of the linear actuator 70 though pin 132, retainers 114 and clevis 92 and the pins through holes 97 and 118.

The trunnion 50 is connected to the carbody 12 as follows. First the trunnion 50 is placed adjacent the carbody 12, as in FIG. 8. The crawler frame connector 90 is pinned to the second end 54 of the trunnion by pins through holes 93 and the holes in brackets 112. The hydraulic cylinder 70 is extended, which pushes the rod 72 outward to a point at which the carbody connector 80 can be connected to the carbody (FIG. 8) as the clevis 82 surrounds tubular member 18. The carbody connector 80 is then connected to the carbody by pinning retaining plates 87 through holes 122 in plates 87 and holes 83 in the clevis member 82. The cylinder 70 is then retracted, thereby pulling the trunnion 50 into a working position with respect to the carbody (FIG. 9). At that point retaining ring 81 can be tightened in groove 55 and pins can be placed through holes 126 in retaining plates 87 and the holes in brackets 110.

Figure 15A:
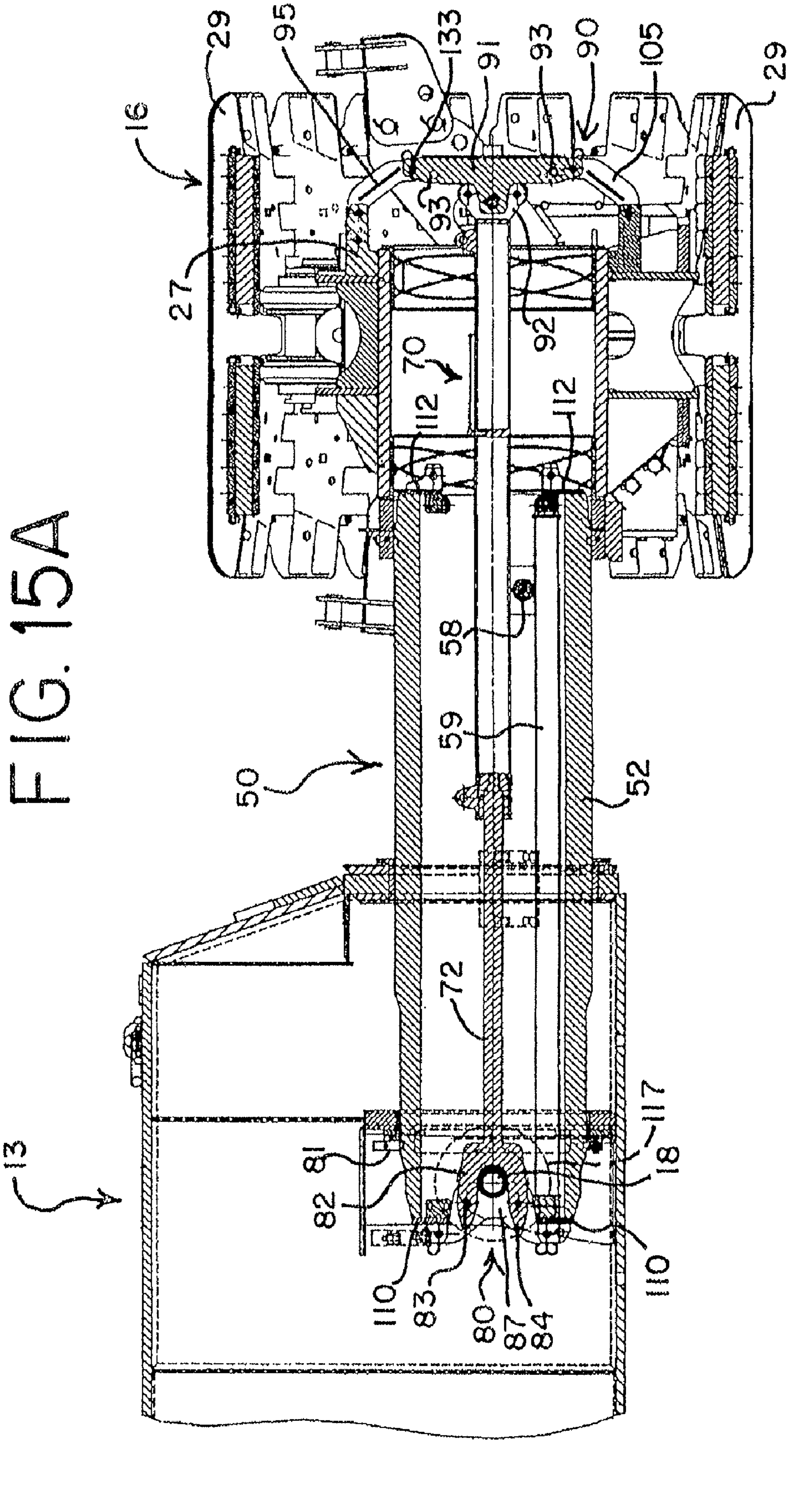
FIG. 15A is a cross-sectional view like FIG. 9 but showing a second step in the crawler being assembled to the trunnion already in place in the carbody.

The crawler is attached by first unpinning the crawler frame connector 90 from the second end of the tubular member 52 and placing the crawler adjacent the trunnion. As shown in FIG. 15, this preferably entails removing not only the pins through holes 93, but also taking the pins out of holes 118 though retainers 114 so that the transverse member 91 can be completely removed from the clevis 92. That way, when the hydraulic cylinder 70 is extended, the clevis 92 can pass though the hole 21 in the crawler frame without fear that the transverse member 91 will either be damaged, or damaging the bushing about which the crawler frame and trunnion pivot. As seen in FIG. 15A, extension of the cylinder 70 now forces the clevis 92 portion of the crawler frame connector 90 to a point at which the transverse member 91 can be reattached, both to the clevis 92 and to the brackets 112, and then the crawler frame connector 90 can be connected to the crawler frame 27. Short links 95 and 105 are connected between the crawler frame 27 and the crawler frame connector 90 by pinning through the holes in the links 95 and 105 and the holes 133 in the transverse member 91.

Figure 30:
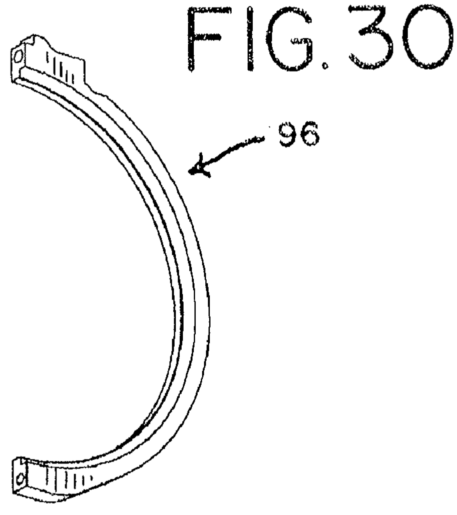
FIG. 30 is a perspective view of one half of the retaining ring used to secure the crawler frame to the trunnion assembly, as shown in FIG. 17, the other half being identical.
Figure 31:
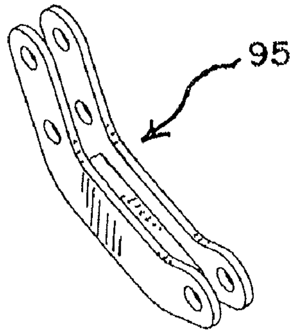
FIG. 31 is a perspective view of a top short link used to connect the trunnion assembly to the crawler frame to move it into a working position, as shown in FIG. 17.

Retracting the hydraulic cylinder 70 pulls the crawler frame into a working position with respect to the trunnion (FIG. 17). The step of pulling the crawler frame into a working position with respect to the trunnion involves pulling crawler frame hole 21 over an end portion of the hollow central tubular member 52. At that point a retaining ring 96 (FIG. 30 shows half of the ring, the other half being identical) is connected in groove 56, further securing the crawler frame to the trunnion tubular member 52, and thus the crawler to the carbody 12. Also, as shown in dashed lines in FIG. 17A, the links 95 and 105 are disconnected from the transverse member 91. Top link 95 has its second pin pulled while the link 95 is pivoted upward, then reinserted so that the link 95 stays in a lifted position. Bottom link 105 is simply allowed to pivot downward. In these positions the links 95 and 105 will not interfere with the transverse member 91. Thus the trunnion and crawler frame are connected together but the crawler frame 27 is able to rotate about the axis 51 of the trunnion 50.

The step of retracting the hydraulic cylinder 70, thereby pulling the trunnion into a working position with respect to the carbody, may occur in a prior crane set up step, since the trunnion may be transported to a new job site while connected to a carbody member, as seen in FIG. 7. In that case, as when following the procedure outlined above, when the crane is set up at the new job site, the crawler is connected to the combined trunnion and carbody, after the trunnion is connected to the carbody beam assembly 13, which occurred previously.

The set-up steps may be reversed, and the trunnion connected to the crawler frame first. In that arrangement, first the trunnion 50 is placed adjacent the crawler 16. The carbody connector 80 is left connected to the first end 53 of the tubular member 52, and the crawler frame connector 90 is disconnected from the second end 54 of the tubular member 52. The hydraulic cylinder 70 is extended, which pushes the piston end 71 outward to a point at which the crawler frame connector 90 can be connected to the crawler frame 27. The crawler frame connector 90 is connected with the short links 95 and 105 to the crawler frame 27. The cylinder 70 is retracted, thereby pulling the crawler frame into a working position with respect to the trunnion. The combined crawler and trunnion is then attached to the carbody by first unpinning the carbody connector 80 from the first end 53 of the tubular member 52 and placing the trunnion adjacent the carbody. Extending the hydraulic cylinder 70 now forces the carbody connector 80 to a point at which the carbody connector can be connected to the carbody. Retracting the hydraulic cylinder 70 pulls the trunnion into the carbody, after which retaining ring 81 may be placed in groove 55.

Figure 5:
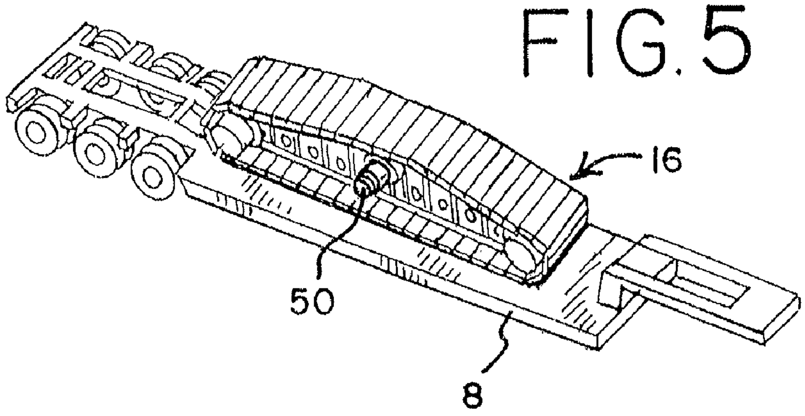
FIG. 5 is a perspective view of a combined crawler and trunnion assembly of the crane of FIG. 1 on a transport trailer.
Figure 13:
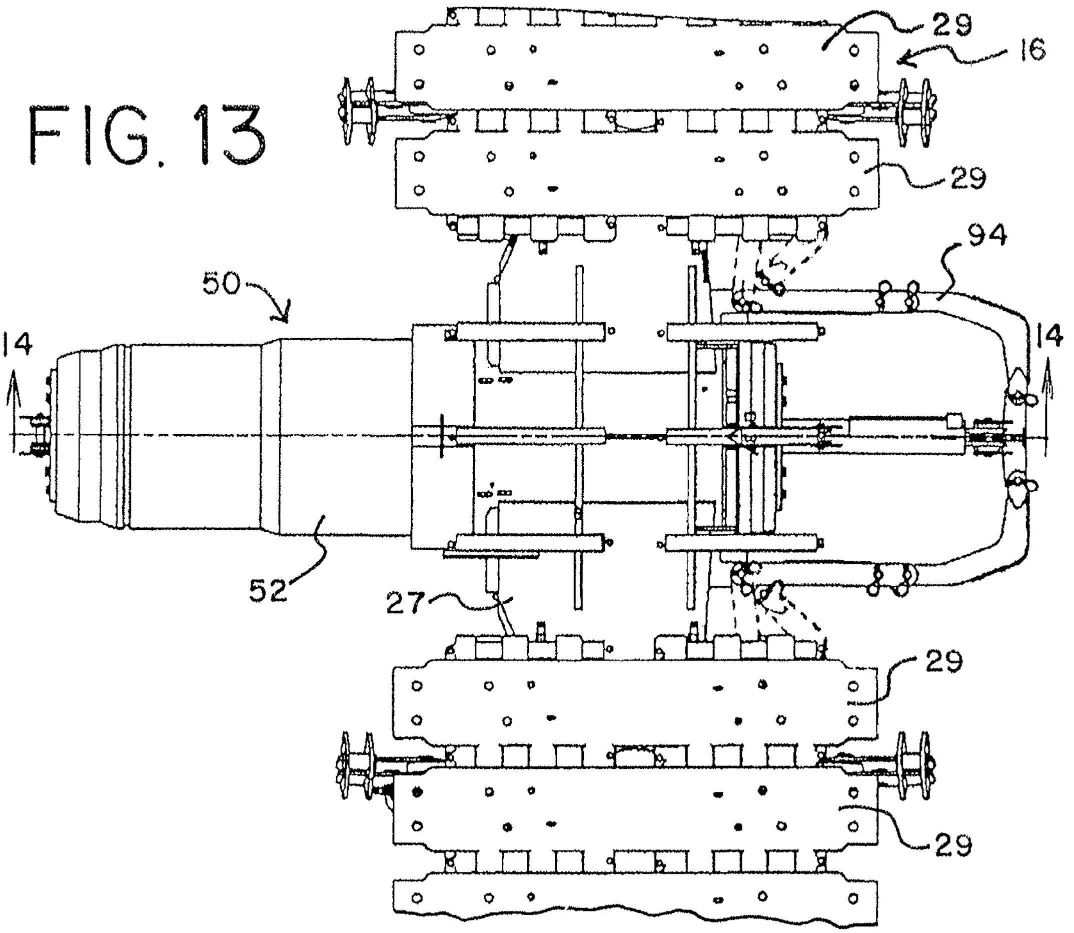
FIG. 13 is a top plan view, partially broken away, of the crawler and trunnion assembly used on the crane of FIG. 1 being moved from its transport configuration into a working position.
Figure 14:
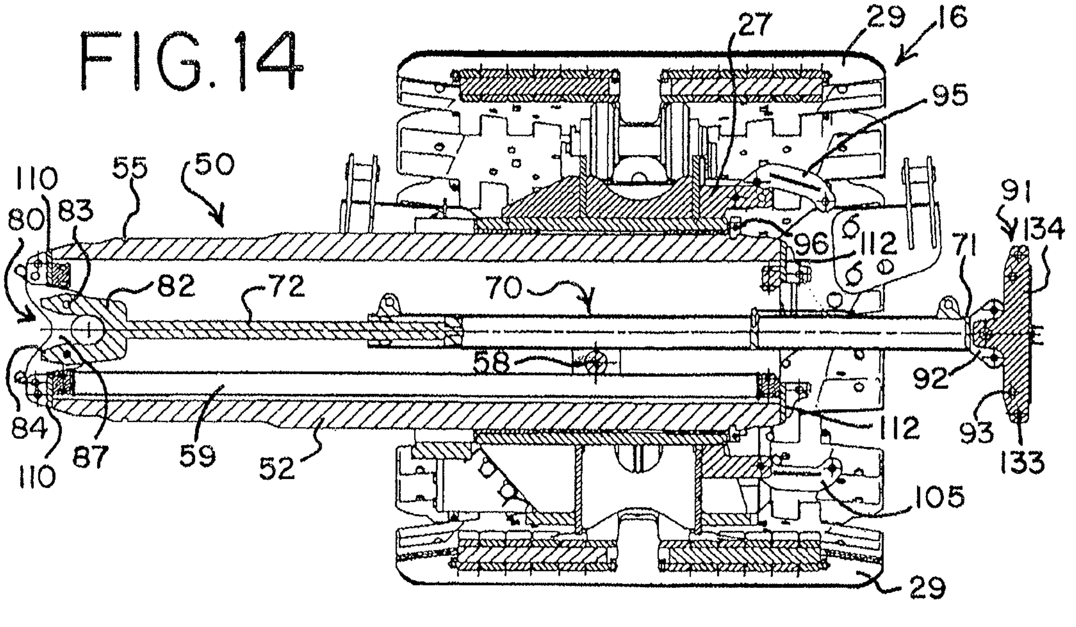
FIG. 14 is a cross-sectional view taken along line 14-14 of FIG. 13.

More frequently, rather than first connecting the trunnion to the crawler frame at a job site, the crawler frame and trunnion will be left in a connected position and transported together, as shown in FIG. 5. However, when that happens, the trunnion is transported to the new job site in a transport position within the crawler frame, wherein the tubular member 52 is positioned more centrally within the crawler frame 27 (FIGS. 11 and 12) than in its working position (FIGS. 13 and 14). This is made possible because the crawler frame connector 90 is connectable with two different sets of links to the crawler frame, the first set of links 95 and 105 being used when the trunnion is pulled into the hole though the crawler frame and in its working position, and the second set of links 94 being used when the trunnion is moved into or stays at the transport position.

Figure 29:
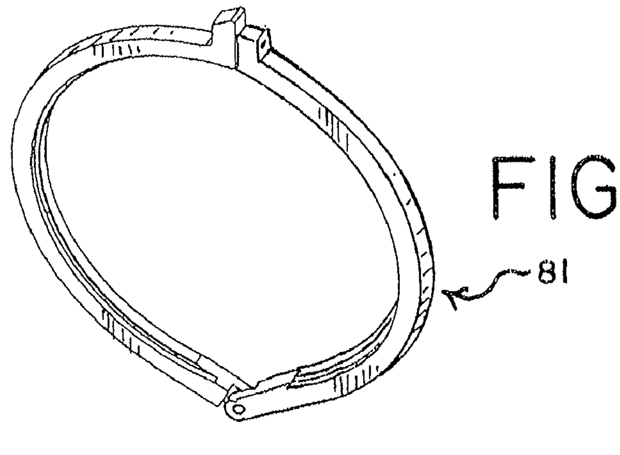
FIG. 29 is a perspective view of the retaining ring used to secure the trunnion assembly to the carbody, as shown in FIG. 9, with the retaining ring in a closed position.

To achieve this, the trunnion is first withdrawn from the carbody. The pins connecting brackets 110 to the retaining plates 87 though holes 126 are removed, and the retaining ring 81 is also removed. Retaining ring 81 is made from two parts that are similar except that one of the parts has a longer tab used to bolt the two parts together. As seen in FIG. 29, this longer tab gives a location to strike a hammer if needed to help open the ring up once the bolt through the tabs is removed.

Second, the hydraulic cylinder 70 is used to push the trunnion out of the holes 61 and 62 in the carbody beam assembly 13 while the crawler 16 is still attached to the trunnion (FIG. 16). The carbody connecter 80 is then disconnected from the carbody by unpinning retaining plates 87 from the clevis member 82. With the trunnion disconnected from the carbody, the cylinder is retracted and the carbody connecter 80 is again secured to the first end 53 of the tubular member 52 by repinning the retaining plates 87 to the clevis member 82. The short links 95 and 105 are unpinned from holes 133 (or they are still unpinned, if the crawler was last in a working, pivotal relationship with the trunnion). As shown in FIG. 14, the hydraulic cylinder 70 is then extended, pushing the piston end of the hydraulic cylinder out of the trunnion tubular member. Next the long links 94 are connected to the crawler frame connector 90 by pinning the links 94 though holes 137 in cross member 136 of transverse member 91. Now when the hydraulic cylinder is retracted, the trunnion tubular member 52 is pulled further inside of the crawler frame, to the position shown in FIGS. 11 and 12. At the new job site, the last steps are reversed, pushing the trunnion back into a working position. When not being used, the long links 94 are folded into a storage position, shown in FIG. 17A and in dashed lines in FIGS. 11 and 13.

In this arrangement, the step of retracting the hydraulic cylinder, thereby pulling the crawler frame into a working position with respect to the trunnion, occurs before the steps of placing the trunnion adjacent the carbody and pulling the trunnion into a working position with the carbody. Also, the step of retracting the hydraulic cylinder, thereby pulling the crawler frame into a working position with respect to the trunnion, occurs in a prior crane set up step, and the trunnion is transported to a new job site while connected to a crawler frame, after which the crane is set up at the new job site, and the crawler and trunnion are connected to the carbody.

The present invention provides a mobile left crane that can be easily disassembled, transported between job sites, and quickly reassembled. Even the carbody can be disassembled into individual side members and end cross members. Being able to use four independently powered crawlers, each mounted on a trunnion, minimizes ground bearing pressure, which reduces the preparation time needed to prepare the foundation on which the crane will operate. Using the present invention makes it possible to easily connect and disconnect the four trunnion mounted crawlers from the carbody in a crane transportation situation, thereby speeding up the tear-down and set-up process. The preferred trunnion assembly, having a powered self-attachment mechanism, allows the trunnion to be inserted in either the crawler frame or the carbody first, and to be transported either by itself or with one of the crawlers or carbody beam assemblies.

It should be understood that various changes and modifications to the presently preferred embodiments described herein will be apparent to those skilled in the art. For example, the linear actuator could be an electrically driven screw rather than a hydraulic cylinder. When a hydraulic cylinder is used, it can be positioned so that the piston end connects to the carbody connector, instead of the crawler frame connector. Also, other locking devices besides tubular member 18 fixed to the carbody could be used to prevent the trunnion from rotating with respect to the carbody. Further, instead of using a bushing in the crawler frame, and having the trunnion fixed in the carbody, the carbody could include a bushing and the trunnion could be designed to rotate within that bushing and stay rigidly attached to the crawler frame during operation.

The carbody connection system and the trunnion transportation system have can be used separately from one another. Also, different carbody connections than those disclosed might be used. Such changes and modifications can be made without departing from the spirit and scope of the present invention and without diminishing its intended advantages. It is therefore intended that such changes and modifications be covered by the appended claims.

The invention claimed is:

1. A mobile lift crane comprising:
- a) a carbody;
- b) at least four crawlers attached to the carbody, each crawler having a crawler frame attached to the carbody by a trunnion having a horizontal axis, the crawler frame being attached to the carbody so as to be able to pivot with respect to the carbody about the horizontal axis of the trunnion;
- c) a rotating bed rotatably connected to the carbody such that the rotating bed can swing with respect to the crawlers; and
- d) a boom pivotally mounted on the rotating bed;
- e) a linear actuator connected between the crawler frame and the carbody and extending through at least one of the trunnions.

2. The mobile lift crane of claim 1 wherein the linear actuator comprises a double-acting hydraulic cylinder having a bore, a piston mounted in said bore and forming a piston end of said cylinder, and a rod connected to said piston opposite said piston end and extending out of an exit end of the bore, thus forming a rod end of said cylinder.

3. The mobile lift crane of claim 2 wherein the at least one trunnion has first and second opposite ends, with the first end detachably connected to the carbody, and the rod end of the hydraulic cylinder is also detachably connected to the carbody.

4. The mobile lift crane of claim 3 wherein the second end of the at least one trunnion is detachably connected to the crawler frame, and the piston end of the hydraulic cylinder is also detachably connected to the crawler frame adjacent the second end of the at least one trunnion.

5. The mobile lift crane of claim 1 wherein the carbody is able to be disassembled into two side members and two end cross members that may be transported separately and reassembled on a job site.

6. The mobile lift crane of claim 5 wherein the carbody further comprises a central cross member that may also be disassembled from the side members and end cross members, the central cross member including a king pin on which the rotating bed is pivotally mounted.

7. The mobile lift crane of claim 1 wherein each crawler further comprises at least one drive tumbler supported on the frame; and a track made of a plurality of connected track shoes and having a ground engaging surface and an inside surface opposite the ground engaging surface, the track being wrapped around the drive tumbler so that a plurality of the shoes are in contact with the drive tumbler, the track passing around the frame.

8. A trunnion for a mobile lift crane having a self attachment mechanism comprising:
- a) a tubular member with a longitudinal axis, a first end configured for connection to a crane carbody and a second end configured for connection to a crawler frame, with at least one of the ends being configured to allow rotational movement of the crawler frame relative to the carbody about the longitudinal axis when the longitudinal axis is oriented horizontally;
- b) a linear actuator mounted within the tubular member, the linear actuator having first and second ends;
- c) a carbody connector attached to the first end of the linear actuator, and a crawler frame connector attached to the second end of the linear actuator.

9. The trunnion of claim 8 wherein the linear actuator comprises a hydraulic cylinder having a bore, a piston mounted in said bore and forming a piston end of said cylinder, and a rod connected to said piston opposite said piston end and extending out of an exit end of the bore, thus forming a rod end of said cylinder.

10. The trunnion of claim 8 wherein the carbody connector comprises a clevis member attached to the first end of the linear actuator, the clevis having extensions each having a hole by which the clevis can be pinned to other structure to connect it to the carbody.

11. The trunnion of claim 8 wherein the crawler frame connector comprises a transverse member connected at its central portion to the second end of the linear actuator and having holes by which the transverse member can be pinned to the crawler frame.

12. The trunnion of claim 8 wherein the tubular member includes a first circumferential groove in the outer surface of the tubular member configured to receive a retaining ring and a second circumferential groove in the outer surface of the tubular member adjacent the second end also configured to receive a retaining ring.

13. The trunnion of claim 8 wherein the linear actuator is connected to a roller that can roll along a longitudinal guide secured to the inside of the trunnion.

14. A method of assembling a mobile lift crane having, during operation, i) a carbody, ii) at least four crawlers each connected to the carbody through a trunnion, each trunnion comprising a hollow central tubular member, the trunnion allowing the crawler to pivot with respect to the carbody, and the crawlers allowing the crane to travel over the ground, iii) a rotating bed rotatably connected to the carbody such that the rotating bed can swing with respect to the crawlers, and iv) a boom pivotally mounted on the rotating bed, with a load hoist line extending there from; the method comprising:

a) providing each trunnion with a self attachment mechanism comprising i) a linear actuator mounted within the hollow central tubular member, the linear actuator having a first end and a second end, ii) a carbody connector attached to the first end of the linear actuator, and iii) a crawler frame connector attached to the second end of the linear actuator;

b) placing the trunnion adjacent the carbody;

c) extending the linear actuator to a point at which the carbody connector can be connected to the carbody, and connecting the carbody connector to the carbody;

d) retracting the linear actuator, thereby pulling the trunnion into a working position with respect to the carbody;

e) placing the crawler adjacent the trunnion;

f) extending the linear actuator to a point at which the crawler frame connector can be connected to the crawler frame, and connecting the crawler frame connector to the crawler frame; and g) retracting the linear actuator, thereby pulling the crawler frame into a working position with respect to the trunnion.

15. The method of claim 14 wherein the step of pulling the trunnion into a working position with the crawler frame involves pulling a crawler frame hole over an end portion of the hollow central tubular member.

16. The method of claim 15 wherein the step of retracting the linear actuator, thereby pulling the crawler frame into a working position with respect to the trunnion, occurs in a prior crane set up step, and the trunnion is transported to a new job site while connected to a crawler frame, after which, when the crane is set up at the new job site, the crawler and trunnion are connected to the carbody.

17. The method of claim 16 wherein the trunnion is transported to the new job site in a transport position within the crawler frame wherein the tubular member is positioned more centrally within the crawler frame than in its working position.

18. The method of claim 17 wherein the crawler frame connector is connectable with two different sets of links to the crawler frame, the first set of links being used when the crawler frame hole is pulled over the end portion of the trunnion and in its working position, and the second set of links being used when the trunnion is in the transport position.

19. The method of claim 14 wherein the step of retracting the linear actuator, thereby pulling the crawler frame into a working position with respect to the trunnion, occurs before the steps of placing the trunnion adjacent the carbody and pulling the trunnion into a working position with the carbody.

20. The method of claim 14 wherein the step of retracting the linear actuator, thereby pulling the trunnion into a working position with respect to the carbody, occurs in a prior crane set up step, and the trunnion is transported to a new job site while connected to a carbody member, and after which, when the crane is set up at the new job site, the crawler is connected to the combined trunnion and carbody.

21. The method of claim 20 wherein the carbody is disassembled into two side members and two end cross members that are each transported separately to the new job site, and the trunnions are connected to the cross members during transportation to the new job site.

* * * * *